US010619579B2

(12) United States Patent
Ono

(10) Patent No.: US 10,619,579 B2
(45) Date of Patent: Apr. 14, 2020

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Tomoyuki Ono, Sunto-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/207,417

(22) Filed: Dec. 3, 2018

(65) Prior Publication Data

US 2019/0195148 A1   Jun. 27, 2019

(30) Foreign Application Priority Data

Dec. 26, 2017 (JP) ................ 2017-249787

(51) Int. Cl.
*F02D 35/02* (2006.01)
*F02D 35/00* (2006.01)
(Continued)

(52) U.S. Cl.
CPC ....... *F02D 35/0092* (2013.01); *F02D 35/027* (2013.01); *F02D 35/028* (2013.01);
(Continued)

(58) Field of Classification Search
CPC .. F02D 35/027; F02D 35/0092; F02D 35/028; F02D 41/0045; F02D 41/3011;
(Continued)

(56) References Cited

U.S. PATENT DOCUMENTS 5,119,783 A   6/1992 Komurasaki
7,007,663 B2 * 3/2006 Mashiki ................ F02D 35/027
123/305

(Continued)

FOREIGN PATENT DOCUMENTS

JP   2010-203342       9/2010
JP   2010-209873 A     9/2010
(Continued)

*Primary Examiner* — Hai H Huynh
*Assistant Examiner* — Gonzalo Laguarda
(74) *Attorney, Agent, or Firm* — Finnegan, Henderson, Farabow, Garrett & Dunner, LLP

(57) ABSTRACT

A control device for an internal combustion engine includes an electronic control unit. The electronic control unit is configured to control an injection amount and an injection timing of fuel to a target injection amount and a target injection timing set based on an engine operation state, detect an ignition timing of fuel based on a vibration component of an engine body in a specific frequency bandwidth, and correct at least one of the target injection amount and the target injection timing based on a deviation between the detected ignition timing and a target ignition timing according to the engine operation state. The specific frequency bandwidth is a bandwidth on a low frequency side of a frequency bandwidth where the engine body undergoes elastic vibration.

8 Claims, 18 Drawing Sheets

(51) Int. Cl.
   *F02D 41/00* (2006.01)
   *F02D 41/30* (2006.01)
   *F02D 41/40* (2006.01)
   *G01M 15/12* (2006.01)
   *F02M 69/50* (2006.01)
   *F02D 41/38* (2006.01)
   *F02M 61/14* (2006.01)
   *F02D 41/14* (2006.01)
   *F02D 41/28* (2006.01)

(52) U.S. Cl.
   CPC ...... *F02D 41/0045* (2013.01); *F02D 41/3011* (2013.01); *F02D 41/3082* (2013.01); *F02D 41/401* (2013.01); *G01M 15/12* (2013.01); F02D 41/3094 (2013.01); F02D 2041/1432 (2013.01); F02D 2041/281 (2013.01); F02D 2041/389 (2013.01); F02D 2200/0618 (2013.01); *F02M 61/14* (2013.01); *F02M 69/50* (2013.01)

(58) Field of Classification Search
   CPC ............... F02D 41/3082; F02D 41/401; F02D 2200/025; F02P 5/152; G01M 15/12; G01L 23/22; G01L 23/221
   USPC .... 123/435, 406.21, 406.37, 406.38, 406.39; 701/111; 73/35.09, 114.07
   See application file for complete search history.

(56) References Cited

U.S. PATENT DOCUMENTS

| | | | | |
|---|---|---|---|---|
| 7,178,505 | B2* | 2/2007 | Shimazaki | F02D 35/028 |
| | | | | 123/406.37 |
| 7,387,107 | B2* | 6/2008 | Kaneko | F02D 35/027 |
| | | | | 123/406.21 |
| 7,942,040 | B2* | 5/2011 | Kaneko | F02D 35/027 |
| | | | | 73/114.07 |
| 8,418,674 | B2* | 4/2013 | Yasuhara | F02D 35/028 |
| | | | | 123/406.23 |
| 2011/0153182 | A1 | 6/2011 | Sasaki | |
| 2019/0285008 | A1* | 9/2019 | Yoneya | F02D 7/00 |

FOREIGN PATENT DOCUMENTS

| | | |
|---|---|---|
| JP | 2011-132814 A | 7/2011 |
| WO | WO 2017/101946 | 6/2017 |

* cited by examiner

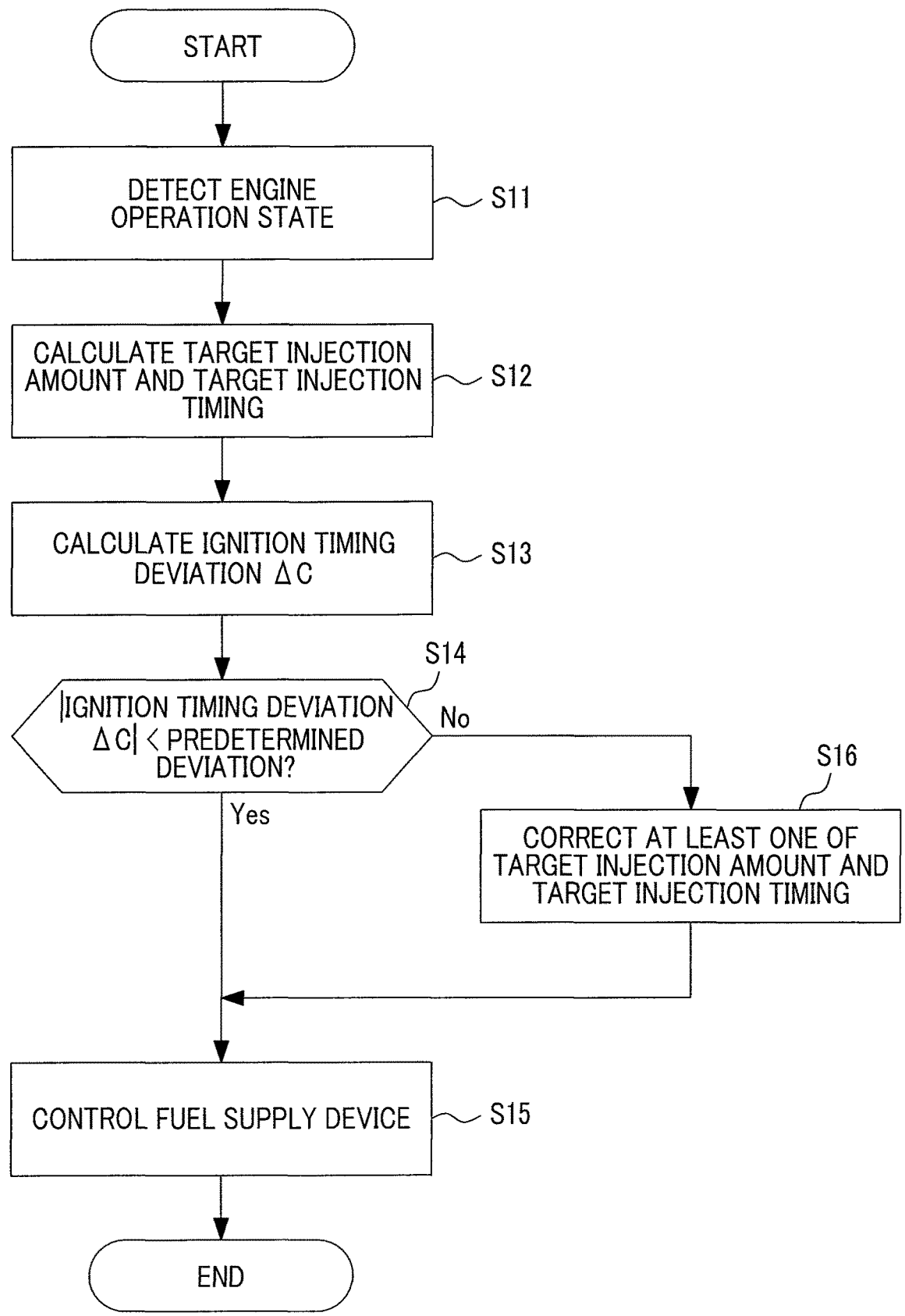

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2017-249787 filed on Dec. 26, 2017 including the specification, drawings and abstract is incorporated herein by reference in its entirety.

BACKGROUND

1. Technical Field

The present disclosure relates to a control device for an internal combustion engine and a control method for an internal combustion engine.

2. Description of Related Art

Japanese Unexamined Patent Application Publication No. 2010-203342 (JP 2010-203342 A) discloses, as a control device for an internal combustion engine of the related art, a control device configured to detect an ignition timing of fuel based on an output value of a knocking sensor subjected to filter processing with a band-pass filter having a predetermined frequency bandwidth (about 5 kHz to about 10 kHz) as a bandwidth.

SUMMARY

However, the output value of the knocking sensor, that is, vibration detected by the knocking sensor includes vibration (hereinafter, referred to as "combustion vibration") that is generated by combustion and vibration (hereinafter, referred to as "mechanical vibration") that is generated by a mechanical factor different from combustion. In the control device disclosed in JP 2010-203342 A, it is not difficult to sufficiently exclude an influence of the mechanical vibration. For this reason, there is a case where it is difficult to detect the ignition timing of fuel with high accuracy.

The disclosure provides a control device for an internal combustion engine and a control method for an internal combustion engine that detect an ignition timing of fuel with high accuracy.

A first aspect of the disclosure relates to a control device for an internal combustion engine. The internal combustion engine includes an engine body, a fuel injection valve configured to inject fuel into a combustion chamber of the engine body, and a vibration sensor configured to detect vibration of the engine body. The control device includes an electronic control unit. The electronic control unit is configured to set a target injection amount and a target injection timing based on an engine operation state. The electronic control unit is configured to control an injection amount and an injection timing of fuel to be injected from the fuel injection valve to the target injection amount and the target injection timing. The electronic control unit is configured to detect an ignition timing of fuel based on a vibration component of the engine body in a specific frequency bandwidth. The electronic control unit is configured to correct at least one of the target injection amount and the target injection timing based on a deviation between the detected ignition timing and a target ignition timing according to the engine operation state. The specific frequency bandwidth is a bandwidth on a low frequency side of a frequency bandwidth where the engine body undergoes elastic vibration. The specific frequency bandwidth is a bandwidth where a ratio of a combustion vibration component that is generated when the engine body is subjected to combustion pressure to vibration components detected by the vibration sensor becomes equal to or greater than a predetermined value.

In the control device, the specific frequency bandwidth may be a frequency bandwidth of 0.1 kHz to 1.8 kHz.

In the control device, the specific frequency bandwidth may be a frequency bandwidth of 0.2 kHz to 0.8 kHz.

In the control device, the electronic control unit may be configured to make the specific frequency bandwidth narrower when an engine rotation speed is higher.

In the control device, the electronic control unit may be configured to calculate a vibration level of the engine body based on a vibration component of the engine body in the specific frequency bandwidth. The electronic control unit may be configured to calculate a mechanical vibration level of the engine body based on the engine operation state. The electronic control unit may be configured to subtract the mechanical vibration level from the vibration level to calculate a combustion vibration level. The electronic control unit may be configured to detect, as an ignition timing of fuel, a timing at which the combustion vibration level becomes equal to or greater than a predetermined combustion determination threshold.

In the control device, the electronic control unit may be configured to specify, based on a waveform of the combustion vibration level at each crank angle simplified using a plurality of thresholds, a principal vibration portion when fuel for generating requested torque is combusted. The electronic control unit may be configured to detect, as an ignition timing of fuel, a timing at which the combustion vibration level becomes equal to or greater than the combustion determination threshold in the principal vibration portion.

In the control device, the electronic control unit may be configured to control the injection amount and the injection timing of fuel to be injected from the fuel injection valve such that fuel causes premix charged compressive ignition in an operation region on a low load side and fuel causes diffusive combustion in an operation region on a high load side. The electronic control unit may be configured to, when fuel is combusted by premix charged compressive ignition, make the combustion determination threshold smaller than when fuel is combusted by diffusive combustion.

In the control device, the electronic control unit may be configured to correct the combustion vibration level based on a moving average value of the deviation for a short period and a moving average value of the deviation for a long period.

A second aspect of the disclosure relates to a control method for an internal combustion engine. The internal combustion engine includes an engine body, a fuel injection valve configured to inject fuel into a combustion chamber of the engine body, and a vibration sensor configured to detect vibration of the engine body. The control method includes: setting, by an electronic control unit, a target injection amount and a target injection timing based on an engine operation state; controlling, by the electronic control unit, an injection amount and an injection timing of fuel to be injected from the fuel injection valve to the target injection amount and the target injection timing, respectively; detecting, by the electronic control unit, an ignition timing of fuel based on a vibration component of the engine body in a specific frequency bandwidth; and correcting, by the electronic control unit, at least one of the target injection amount and the target injection timing based on a deviation between the detected ignition timing and a target ignition timing according to the engine operation state. The specific frequency bandwidth is a bandwidth on a low frequency side of a frequency bandwidth where the engine body undergoes elastic vibration. The specific frequency bandwidth is a bandwidth where a ratio of a combustion vibration component that is generated when the engine body is subjected to combustion pressure to vibration components detected by the vibration sensor becomes equal to or greater than a predetermined value.

According to the aspects of the disclosure, it is possible to detect an ignition timing of fuel with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart illustrating fuel injection control according to the first embodiment of the disclosure;

DETAILED DESCRIPTION OF EMBODIMENTS

Figure 1:
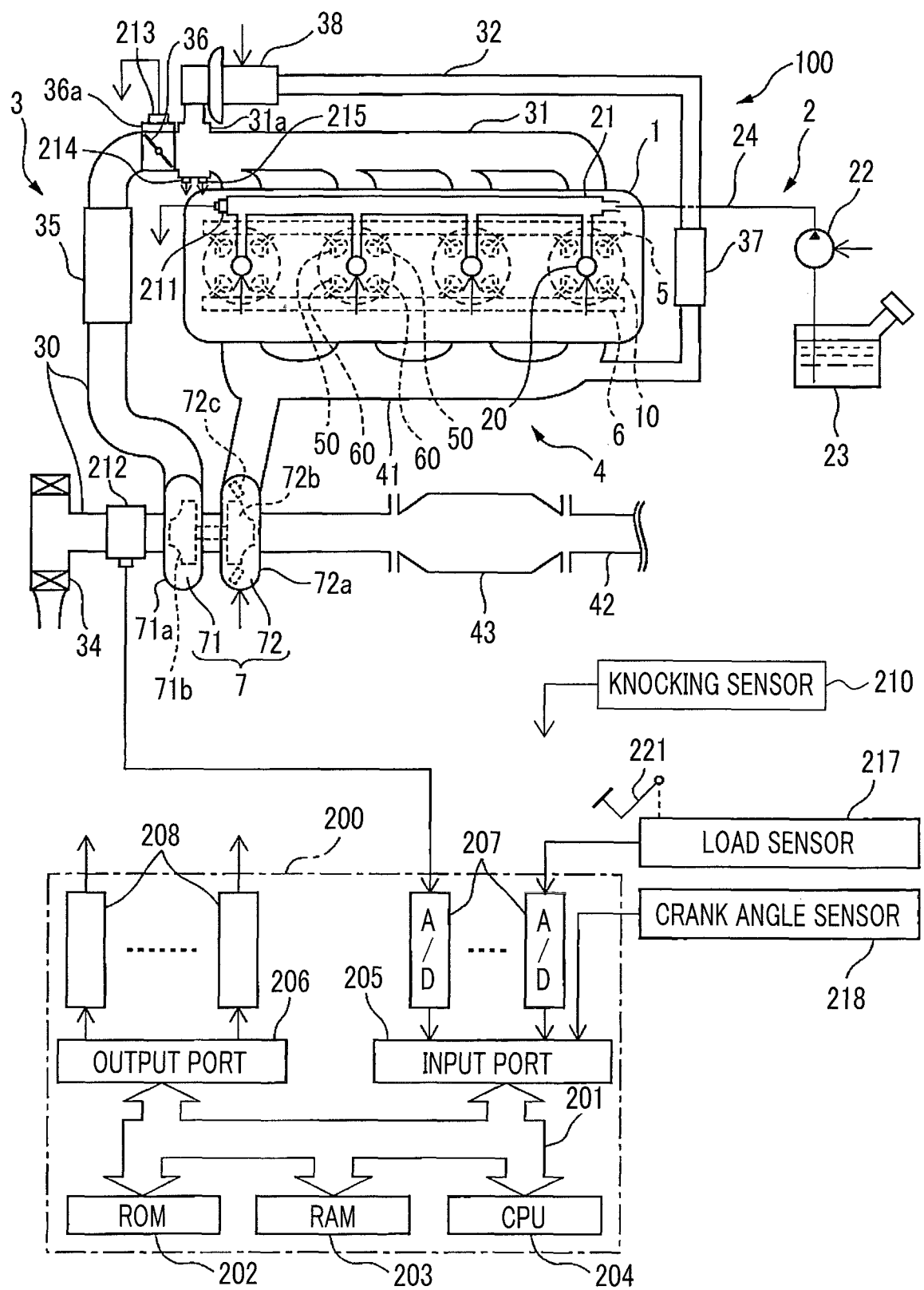
FIG. 1 is a schematic configuration diagram of an internal combustion engine and an electronic control unit configured to control the internal combustion engine according to a first embodiment of the disclosure.

Hereinafter, respective embodiments of the disclosure will be described in detail referring to the drawings. In the following description, the same constituent elements are represented by the same reference numerals.

First Embodiment

FIG. 1 is a schematic configuration of an internal combustion engine 100 and an electronic control unit 200 configured to control the internal combustion engine 100 according to a first embodiment of the disclosure.

As shown in FIG. 1, the internal combustion engine 100 includes an engine body 1 having a plurality of cylinders 10, a fuel supply device 2, an intake device 3, an exhaust device 4, an intake valve operating device 5, and an exhaust valve operating device 6.

The engine body 1 makes fuel be combusted by self-ignition combustion inside a combustion chamber formed in each cylinder 10, for example, to generate power for driving a vehicle or the like. In the engine body 1, a pair of intake valves 50 and a pair of exhaust valves 60 are provided for each cylinder. A knocking sensor 210 that detects vibration of the engine body 1 is attached to the engine body 1. The knocking sensor 210 is a kind of vibration sensor (acceleration sensor) including a piezoelectric element, and outputs a voltage value according to vibration of the engine body 1.

The fuel supply device 2 includes an electronic control type fuel injection valve 20, a delivery pipe 21, a supply pump 22, a fuel tank 23, a pumping pipe 24, and a fuel pressure sensor 211.

The single fuel injection valve 20 is provided in each cylinder 10 to face the combustion chamber of each cylinder 10 such that fuel can be injected directly into the combustion chamber. A valve opening time (injection amount) and a valve opening timing (injection timing) of the fuel injection valve 20 are changed by a control signal from the electronic control unit 200, and when the fuel injection valve 20 is opened, fuel is injected directly from the fuel injection valve 20 into the combustion chamber.

The delivery pipe 21 is connected to the fuel tank 23 through the pumping pipe 24. In the middle of the pumping pipe 24, the supply pump 22 that pressurizes fuel stored in the fuel tank 23 and supplies fuel to the delivery pipe 21 is provided. The delivery pipe 21 temporarily stores high pressure fuel pumped from the supply pump 22. When the fuel injection valve 20 is opened, high pressure fuel stored in the delivery pipe 21 is injected directly from the fuel injection valve 20 into the combustion chamber.

The supply pump 22 is configured to be able to change an ejection amount, and the ejection amount of the supply pump 22 is changed according to a control signal from the electronic control unit 200. With the control of the ejection amount of the supply pump 22, fuel pressure inside the delivery pipe 21, that is, injection pressure of the fuel injection valve 20 is controlled.

The fuel pressure sensor 211 is provided in the delivery pipe 21. The fuel pressure sensor 211 detects fuel pressure inside the delivery pipe 21, that is, pressure (injection pressure) of fuel to be injected from each fuel injection valve 20 into each cylinder 10.

The intake device 3 is a device that guides intake air into the combustion chamber, and is configured to be able to change a state (intake pressure (supercharging pressure), intake temperature, amount of exhaust gas recirculation (EGR) gas) of intake air to be sucked into the combustion chamber. The intake device 3 includes an intake pipe 30 and an intake manifold 31 to be an intake passage, and an EGR passage 32.

The intake pipe 30 has a first end connected to an air cleaner 34, and a second end connected to an intake collector 31a of the intake manifold 31. In the intake pipe 30, an air flowmeter 212, a compressor 71 of an exhaust turbocharger 7, an intercooler 35, and a throttle valve 36 are provided in order from an upstream side.

The air flowmeter 212 detects a flow rate of air that flows inside the intake pipe 30 and is finally sucked into the cylinder 10.

The compressor 71 includes a compressor housing 71a and a compressor wheel 71b disposed inside the compressor housing 71a. The compressor wheel 71b is rotationally driven by a turbine wheel 72b of the exhaust turbocharger 7 attached on the same shaft, and compresses and ejects intake air flowing inside the compressor housing 71a. In a turbine 72 of the exhaust turbocharger 7, a variable nozzle 72c that controls a rotation speed of the turbine wheel 72b is provided. With the control of the rotation speed of the turbine wheel 72b by the variable nozzle 72c, pressure (supercharging pressure) of intake air to be sucked from the inside of the compressor housing 71a is controlled.

The intercooler 35 is a heat exchanger that cools intake air having been compressed by the compressor 71 and having reached a high temperature using, for example, traveling air, a coolant, or the like.

The throttle valve 36 changes a passage cross-sectional area of the intake pipe 30, thereby adjusting the amount of intake air to be introduced into the intake manifold 31. The throttle valve 36 is driven in to be opened and closed by a throttle actuator 36a, and an opening degree (throttle opening degree) of the throttle valve 36 is detected by a throttle sensor 213.

The intake manifold 31 is connected to an intake port 14 formed in the engine body 1 and evenly distributes intake air flowing from the intake pipe 30 to each cylinder 10 through the intake port 14. In the intake collector 31a of the intake manifold 31, an intake pressure sensor 214 that detects pressure (intake pressure) of intake air to be sucked into the cylinder, and an intake temperature sensor 215 that detects a temperature (intake temperature) of intake air to be sucked into the cylinder are provided.

The EGR passage 32 is a passage that communicates with an exhaust manifold 41 and the intake collector 31a of the intake manifold 31, and returns a part of exhaust gas discharged from each cylinder 10 to the intake collector 31a using a pressure difference. Hereinafter, exhaust gas flowing into the EGR passage 32 is referred to as "EGR gas", and a ratio of an amount of EGR gas to an amount of gas in the cylinder, that is, a recirculation rate of exhaust gas is referred to as an "EGR rate". EGR gas is recirculated to the intake collector 31a and in turn each cylinder 10, whereby it is possible to reduce a combustion temperature and to suppress discharge of nitrogen oxide (NOx). In the EGR passage 32, an EGR cooler 37 and an EGR valve 38 are provided in order from an upstream side.

The EGR cooler 37 is a heat exchanger that cools EGR gas using, for example, traveling air, a coolant, or the like.

The EGR valve 38 is an electromagnetic valve in which an opening degree is adjustable in a continuous or stepwise manner, and the opening degree of the EGR valve 38 is controlled by the electronic control unit 200 according to an engine operation state. With the control of the opening degree of the EGR valve 38, a flow rate of EGR gas to be recirculated to the intake collector 31a is adjusted.

The exhaust device 4 is a device that discharges exhaust gas from the inside of the cylinder, and includes an exhaust manifold 41 and an exhaust passage 42.

The exhaust manifold 41 is connected to an exhaust port 15 formed in the engine body 1. The exhaust manifold 41 gathers exhaust gas discharged from each cylinder 10 and introduces exhaust gas into the exhaust passage 42.

In the exhaust passage 42, the turbine 72 of the exhaust turbocharger 7 and exhaust post-treatment device 43 are provided in order from an upstream side.

The turbine 72 includes a turbine housing 72a and the turbine wheel 72b disposed in the turbine housing 72a. The turbine wheel 72b is rotationally driven by energy of exhaust gas flowing into the turbine housing 72a and drives the compressor wheel 71b attached on the same shaft.

Outside the turbine wheel 72b, the above-described variable nozzle 72c is provided. The variable nozzle 72c functions as a throttle valve, and a nozzle opening degree (valve opening degree) of the variable nozzle 72c is controlled by the electronic control unit 200. The nozzle opening degree of the variable nozzle 72c is changed, whereby it is possible to change a flow velocity of exhaust gas driving the turbine wheel 72b inside the turbine housing 72a. That is, the nozzle opening degree of the variable nozzle 72c is changed, whereby it is possible to change the rotation speed of the turbine wheel 72b to change supercharging pressure. Specifically, when the nozzle opening degree of the variable nozzle 72c is made small (the variable nozzle 72c is throttled), the flow velocity of exhaust gas increases to increase the rotation speed of the turbine wheel 72b, and supercharging pressure increases.

The exhaust post-treatment device 43 is a device that controls exhaust gas and discharges exhaust gas to outside air, and includes various exhaust gas control catalysts that control harmful substances, a filter that traps harmful substances, and the like.

The intake valve operating device 5 is a device that drives an intake valve 50 of each cylinder 10 to be opened and closed, and is provided in the engine body 1. The intake valve operating device 5 according to the first embodiment is configured to drive the intake valve 50 to be opened and closed by, for example, an electromagnetic actuator such that an opening and closing timing of the intake valve 50 can be controlled. However, the disclosure is not limited thereto. The intake valve 50 may be configured to be driven to be opened and closed by an intake camshaft, and a variable valve operating mechanism that changes a relative phase angle of the intake camshaft with respect to a crankshaft through hydraulic control may be provided in one end portion of the intake camshaft, thereby allowing the opening and closing timing of the intake valve 50 to be controlled.

The exhaust valve operating device 6 is a device that drives an exhaust valve 60 of each cylinder 10 to be opened and closed, and is provided in the engine body 1. The exhaust valve operating device 6 according to the first embodiment is configured to drive the exhaust valve 60 to be opened and closed by, for example, an electromagnetic actuator such that an opening and closing timing of the exhaust valve 60 can be controlled. However, the disclosure is not limited thereto. The exhaust valve 60 may be configured to be driven to be opened and closed by an exhaust camshaft, and a variable valve operating mechanism that changes a relative phase angle of the exhaust camshaft with respect to the crankshaft through hydraulic control may be provided in one end portion of the exhaust camshaft, thereby allowing the opening and closing timing of the exhaust valve 60 to be controlled. For example, a cam profile may be changed by hydraulic pressure or the like, thereby allowing the opening and closing timing or a lift amount of the exhaust valve 60 to be changed.

The electronic control unit 200 is constituted of a digital computer, and includes a read only memory (ROM) 202, a random access memory (RAM) 203, a central processing unit (CPU) (microprocessor) 204, an input port 205, and an output port 206 connected to one another by a bidirectional bus 201.

An output signal of the above-described fuel pressure sensor 211 or the like is input to the input port 205 through each corresponding analog-digital (AD) converter 207. An output signal of a load sensor 217 that generates an output voltage proportional to a depression amount of an accelerator pedal 220 is input as a signal for detecting an engine load to the input port 205 through the corresponding AD converter 207. An output signal of a crank angle sensor 218 that generates an output pulse each time the crankshaft of the engine body 1 rotates by, for example, 15°, is input as a signal for calculating the engine rotation speed or the like to the input port 205. As described above, the output signals of various sensors needed for controlling the internal combustion engine 100 are input to the input port 205.

The output port 206 is connected to each control component of the fuel injection valve 20 or the like through a corresponding drive circuit 208.

The electronic control unit 200 outputs a control signal for controlling each control component from the output port 206 based on the output signals of various sensors input to the input port 205 to control the internal combustion engine 100. Hereinafter, control of the internal combustion engine 100 in the electronic control unit 200 according to the first embodiment will be described.

The electronic control unit 200 performs control of the fuel injection valve 20 based on the engine operation state (engine rotation speed and engine load) such that an ignition timing of fuel becomes a target ignition timing.

In the first embodiment, the electronic control unit 200 sets an injection amount and an injection timing of fuel to be injected from the fuel injection valve 20 to a target injection amount and a target injection timing set according to the engine operation state such that fuel is combusted by diffusive combustion in all operation region. Specifically, the electronic control unit 200 carries out multi-stage injection (in the first embodiment, pilot injection, main injection, and after injection) and controls the injection amount and the injection timing of fuel to be injected from the fuel injection valve 20 such that fuel injected into the combustion chamber by the main injection is combusted with a short ignition delay time (a time until fuel injected into the combustion chamber reaches self-ignition) without substantial delay after fuel injection.

Here, when the ignition timing is deviated from the target ignition timing, exhaust gas emission may be deteriorated or the output of the engine body 1 may be lowered to cause fluctuation in torque. For this reason, when the ignition timing of fuel is detected, and there is a deviation equal to or greater than a predetermined value between the detected ignition timing and the target ignition timing, in order to correct the deviation, it is desirable to correct at least one of the target injection amount and the target injection timing of fuel to be injected from the fuel injection valve 20.

As a method of detecting the ignition timing, for example, a method that attaches an in-cylinder pressure sensor to the engine body 1 and detects the ignition timing based on an output value of the in-cylinder pressure sensor is exemplified. According to the method, since fluctuation in pressure inside each cylinder can be directly detected by the in-cylinder pressure sensor, it is possible to detect the ignition timing with high accuracy. However, since the in-cylinder pressure sensors corresponding to the number of cylinders are needed and the unit price of the in-cylinder pressure sensor itself is high, cost increases.

When the ignition timing can be detected based on an output value of the knocking sensor 210 with high accuracy, since the knocking sensor 210 is low in unit price and a minimum of one knocking sensor 210 may be attached to the engine body 1, it is possible to suppress an increase in cost.

However, the output value of the knocking sensor 210, that is, vibration to be detected by the knocking sensor 210 includes combustion vibration that is generated when the engine body 1 is subjected to combustion pressure, and mechanical vibration that is generated by a mechanical factor different from the combustion vibration. The mechanical vibration is vibration that is indispensably generated when the crankshaft is rotated regardless of the presence or absence of combustion, and is, for example, vibration that is generated when the engine body 1 is subjected to external force from a piston or the like, vibration (vibration generated from a timing chain, or the like) accompanied with a rotation order.

Accordingly, the mechanical vibration is indispensably included as noise in the output value of the knocking sensor 210, and a vibration level (hereinafter, referred to as a "detected vibration level") [dB] of the engine body 1 that is calculated by subjecting the output value of the knocking sensor 210 to various kinds of processing can be considered as a level obtained by adding a combustion vibration level due to the combustion vibration to a mechanical vibration level due to the mechanical vibration.

For example, in detecting the ignition timing based on the output value of the knocking sensor 210 with high accuracy, there is a need to exclude the influence of the mechanical vibration to be noise from the output value of the knocking sensor 210 as much as possible. The inventors have studied in order to exclude the influence of the mechanical vibration from the output value of the knocking sensor 210, and have found that there is a frequency bandwidth where the mechanical vibration is reduced.

Figure 2:
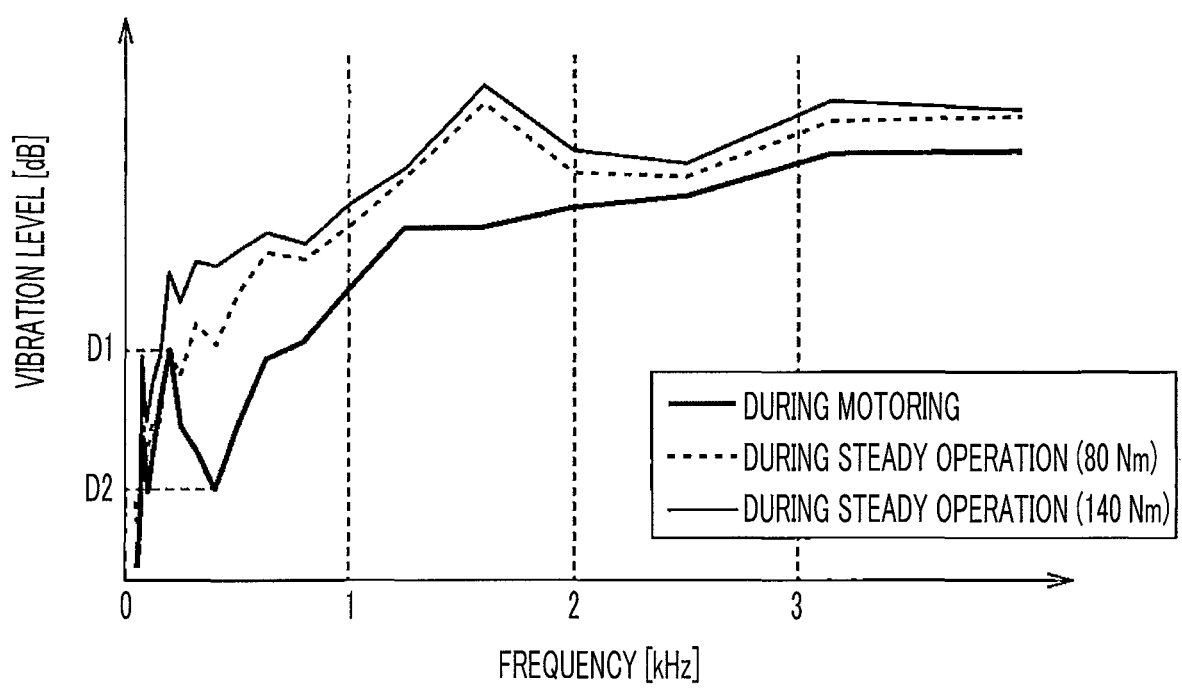
FIG. 2 is a graph comparing a vibration level of an engine body at each frequency calculated by subjecting an output value of a knocking sensor to ⅓ octave band processing during motoring and during a steady operation.

FIG. 2 is a graph comparing an vibration level (detected vibration level) of the engine body 1 at each frequency calculated by subjecting the output value of the knocking sensor 210 to ⅓ octave band processing during motoring (a state in which the crankshaft is rotating without carrying out combustion) and during a steady operation in which the engine body 1 is operating with given output torque (80 Nm and 140 Nm). In FIG. 2, the detected vibration level during motoring is an example of the mechanical vibration level, and the detected vibration level during the steady operation is an example of the level obtained by adding the combustion vibration level to the mechanical vibration level.

As shown in FIG. 2, the vibration level during motoring, that is, the mechanical vibration level takes a maximum value D1 in a frequency bandwidth of about 0.1 kHz or less, and takes a minimum value D2 in a frequency bandwidth of about 0.2 kHz to about 0.8 kHz to be smaller than the maximum value D1. As described above, in the example shown in FIG. 2, it is understood that the mechanical vibration level is lower in the frequency bandwidth of about 0.2 kHz to 0.8 kHz than in other frequency bandwidths.

Then, in the example shown in FIG. 2, vibration in the frequency bandwidth of about 0.1 kHz or less is vibration that is generated when the engine body 1 undergoes rigid body vibration, and vibration in a frequency bandwidth of about 0.1 kHz or more is vibration that is generated when the engine body 1 undergoes elastic vibration. The rigid body vibration is vibration that is generated when the shape of the engine body 1 is not changed and the engine body 1 is displaced while maintaining the shape. The elastic vibration is vibration that is generated when the shape of the engine body 1 is changed.

Accordingly, it can be considered that the mechanical vibration level takes the maximum value D1 in a frequency bandwidth (hereinafter, referred to as a "rigid body frequency bandwidth") where the engine body 1 undergoes the rigid body vibration, is lower than the maximum value D1 once in a bandwidth on a low frequency side of a frequency bandwidth (hereinafter, referred to as an "elastic frequency bandwidth") where the engine body 1 undergoes elastic vibration, and becomes greater than the maximum value D1 in a bandwidth on a high frequency side of the elastic frequency bandwidth.

As shown in FIG. 2, it is understood that, unlike the vibration level during motoring, the vibration level (=mechanical vibration level+combustion vibration level) during the steady operation does not have a frequency bandwidth where the vibration level is clearly lowered, and takes a value comparatively higher than the vibration level during motoring in a frequency bandwidth of about 0.1 kHz to about 1.8 kHz.

Accordingly, it can be considered that the frequency bandwidth of about 0.1 kHz to about 1.8 kHz, and in particular, the frequency bandwidth of about 0.2 kHz to about 0.8 kHz is a frequency bandwidth where a ratio of the mechanical vibration level to the vibration level during the steady operation becomes smaller than a ratio of the combustion vibration level compared to other frequency bandwidths.

That is, it can be considered that the frequency bandwidth of about 0.1 kHz to about 1.8 kHz, and in particular, the frequency bandwidth of about 0.2 kHz to about 0.8 kHz is a frequency bandwidth where a ratio of the combustion vibration level to the detected vibration level becomes equal to or greater than a predetermined value, and a frequency bandwidth where the influence of the mechanical vibration is reduced compared to other frequency bandwidths.

In the first embodiment, the ignition timing is detected based on the output value of the knocking sensor 210 subjected to filter processing using a band-pass filter having, as a bandwidth, the frequency bandwidth (hereinafter, referred to as a "specific frequency bandwidth") where the influence of the mechanical vibration is reduced. Hereinafter, detection control of the ignition timing and fuel injection control according to the first embodiment will be described.

Figure 3:
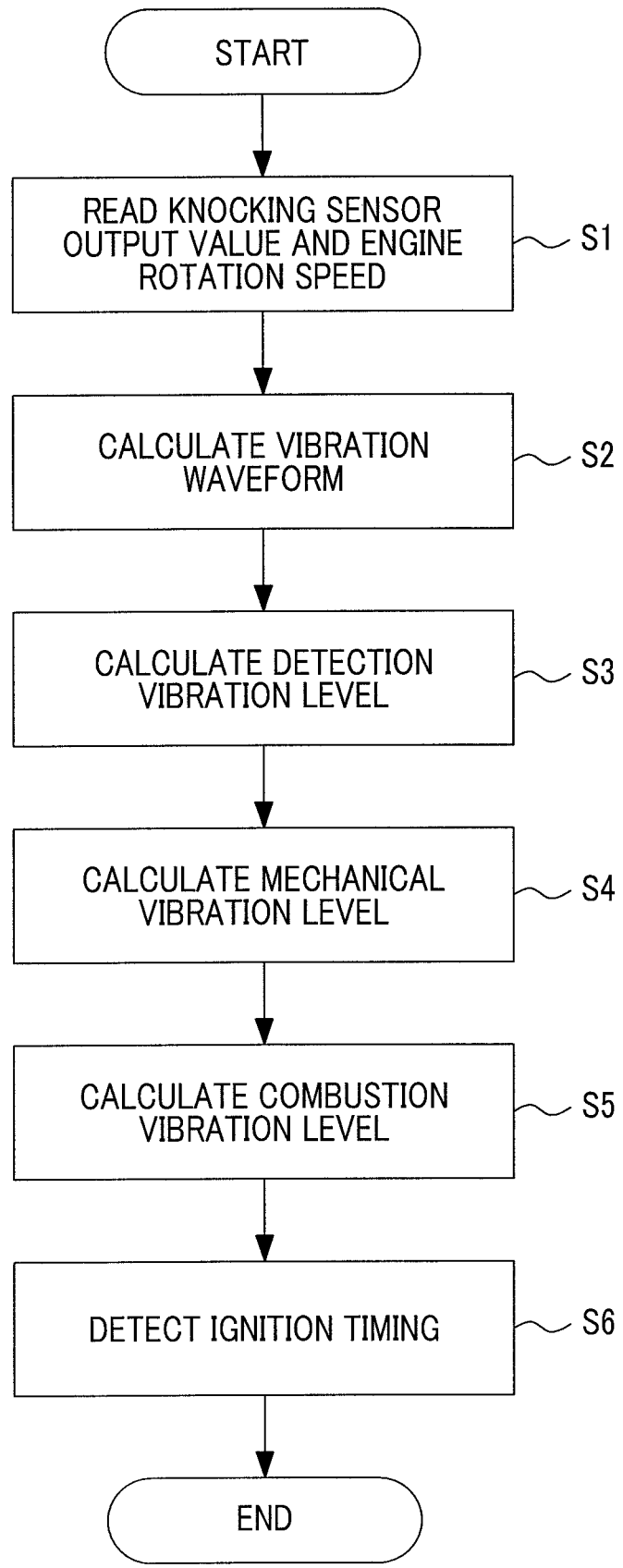
FIG. 3 is a flowchart illustrating detection control of an ignition timing according to the first embodiment of the disclosure.

FIG. 3 is a flowchart illustrating detection control of the ignition timing according to the first embodiment.

In Step S1, the electronic control unit 200 reads the engine rotation speed calculated based on the output value of the knocking sensor 210 and the output signal of the crank angle sensor 218.

In Step S2, the electronic control unit 200 subjects the output value of the knocking sensor 210 to filter processing using a band-pass filter having the specific frequency bandwidth as a bandwidth, and calculates a vibration waveform obtained by extracting a vibration component at each crank angle of the specific frequency bandwidth. In the first embodiment, the specific frequency bandwidth is set to a frequency bandwidth of 0.2 kHz to 0.8 kHz.

In Step S3, the electronic control unit 200 subjects the vibration waveform calculated in Step S2 to envelope processing to calculate the magnitude of amplitude of the vibration waveform at each crank angle, that is, the detected vibration level at each crank angle. In the first embodiment, since the specific frequency bandwidth is set to the frequency bandwidth of 0.2 kHz to 0.8 kHz, a reference frequency during the envelope processing is set to about 0.4 kHz to about 0.5 kHz to be the center of the specific frequency bandwidth.

In Step S4, the electronic control unit 200 refers to a map in which the engine rotation speed is associated with the mechanical vibration level at each crank angle, and calculates the mechanical vibration level at each crank angle based on the engine rotation speed. As described above, the mechanical vibration is vibration that is indispensably generated when the crankshaft is rotated regardless of the presence or absence of combustion. For this reason, when the mechanical vibration level at each crank angle for each engine rotation speed is calculated by an experiment or the like in advance, it is possible to create a map in which the engine rotation speed is associated with the mechanical vibration level at each crank angle. The mechanical vibration level is an example of the detected vibration level during motoring as described above, and the map may be corrected based on the detected vibration level during fuel cut.

In Step S5, the electronic control unit 200 subtracts the mechanical vibration level from the detected vibration level to calculate the combustion vibration level and calculates a waveform (hereinafter, referred to as a "combustion vibration waveform") of the combustion vibration level at each crank angle.

In Step S6, the electronic control unit 200 refers to the combustion vibration waveform and detects, as the ignition timing, a crank angle at which the combustion vibration level becomes equal to or greater than a predetermined combustion determination threshold.

As in the first embodiment, when the multi-stage injection is carried out and fuel is combusted, while there is a need to detect a combustion timing of main injection fuel for generating requested torque as the ignition timing, the combustion vibration level is high even at a combustion timing of pilot injection fuel or at a combustion timing of after injection fuel. For this reason, when the multi-stage injection is carried out, it is desirable to set the combustion determination threshold to be higher than the combustion vibration level at the time of combustion of pilot injection fuel or at the time of combustion of after injection fuel.

Figure 4A:
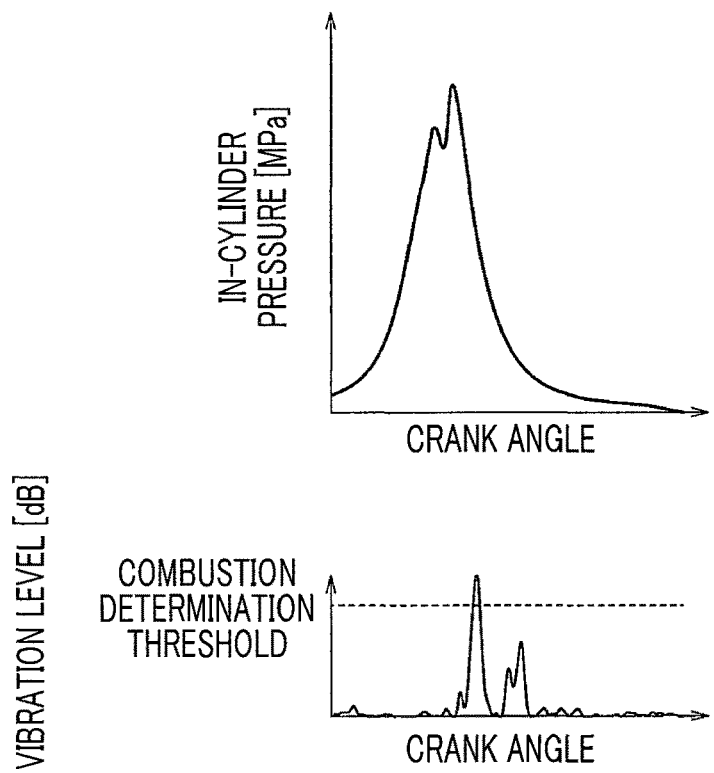
FIG. 4A is a graph showing the relationship between a detected vibration level when a specific frequency bandwidth is set to a frequency bandwidth of 0.2 kHz to 0.8 kHz and in-cylinder pressure.
Figure 4B:
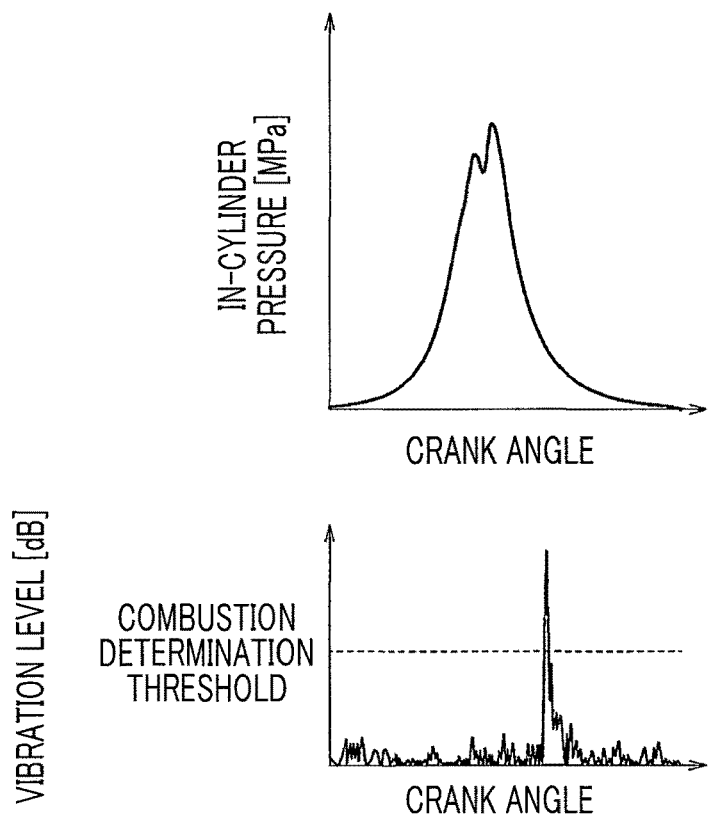
FIG. 4B is a graph showing the relationship between a detected vibration level when the specific frequency bandwidth is set to a frequency bandwidth of 0.1 kHz to 1.8 kHz and in-cylinder pressure.
Figure 4C:
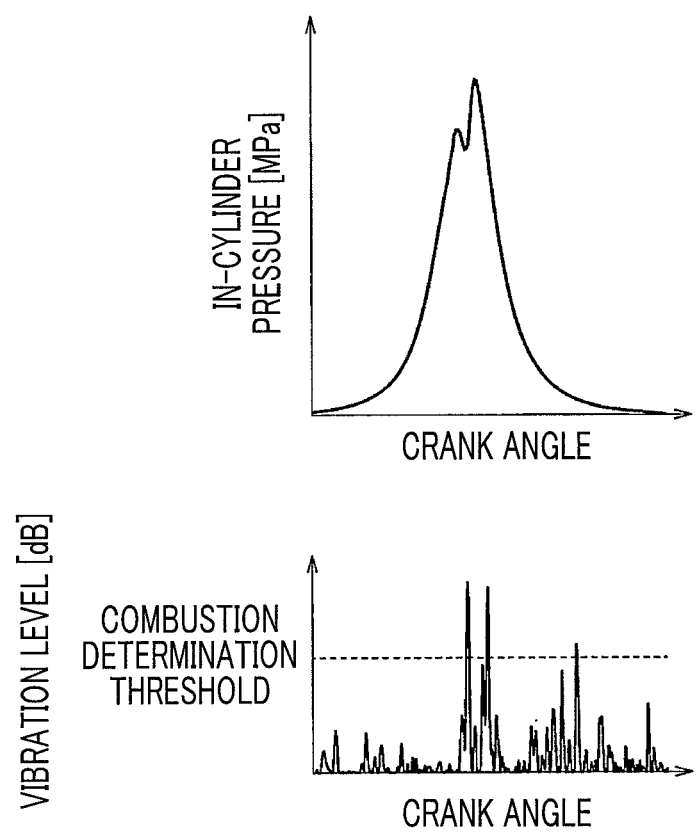
FIG. 4C is a graph showing the relationship between a detected vibration level when the specific frequency bandwidth is set to a frequency bandwidth of 1.0 kHz to 3.0 kHz and in-cylinder pressure as a comparative example.

FIG. 4A is a graph showing the relationship between the detected vibration level when the specific frequency bandwidth is set to the frequency bandwidth of 0.2 kHz to 0.8 kHz and the in-cylinder pressure. FIG. 4B is a graph showing the relationship between the detected vibration level when the specific frequency bandwidth is set to the frequency bandwidth of 0.1 kHz to 1.8 kHz and the in-cylinder pressure. FIG. 4C is a graph showing the relationship between the detected vibration level when the specific frequency bandwidth is set to a frequency bandwidth of 1.0 kHz to 3.0 kHz and the in-cylinder pressure as a comparative example.

As shown in FIG. 4A, when the specific frequency bandwidth is set to the frequency bandwidth of 0.2 kHz to 0.8 kHz, the detected vibration level is higher than the combustion determination threshold corresponding to combustion (an increase in in-cylinder pressure) of main injection fuel. It is understood that the detected vibration level is lower than the combustion determination threshold at other timings.

As shown in FIG. 4B, when the specific frequency bandwidth is set to the frequency bandwidth of 0.1 kHz to 1.8 kHz, while noise is increased more than when the specific frequency bandwidth is set to the frequency bandwidth of 0.2 kHz to 0.8 kHz, the detected vibration level is higher than the combustion determination threshold corresponding to combustion of main injection fuel. It is understood that the detected vibration level is lower than the combustion determination threshold at other timings.

As shown in FIG. 4C, when the specific frequency bandwidth is set to the frequency bandwidth of 1.0 kHz to 3.0 kHz, it is understood that noise is increased, and the detected vibration level is higher than the combustion determination threshold even at a timing other than the combustion timing of main injection fuel. For this reason, a timing other than the combustion timing of main injection fuel may be erroneously detected as the ignition timing.

As described above, according to the first embodiment, the detected vibration level is calculated based on the output value of the knocking sensor 210 subjected to the filter processing using the band-pass filter having the specific frequency bandwidth as a bandwidth, whereby it is possible to make the ratio of the mechanical vibration level to the detected vibration level small, and conversely, to make the ratio of the combustion vibration level large. For this reason, since it is possible to detect a combustion vibration component included in vibration detected by the knocking sensor 210 with high accuracy, it is possible to detect the ignition timing of fuel with high accuracy.

As in the first embodiment, when the detected vibration level at each crank angle is calculated by subjecting the output value of the knocking sensor 210 to the filter processing using the band-pass filter having the specific frequency bandwidth as a bandwidth, a detection delay (a delay until the combustion vibration is detected) due to the filter processing occurs. The detection delay due to the filter processing basically has a fixed value determined in advance according to the structure, material, or the like of the engine body 1.

Accordingly, when the detection delay due to the filter processing described above is not negligible on the detection accuracy of the ignition timing, a timing obtained by subtracting a crank angle corresponding to the detection delay due to the filter processing from the ignition timing detected in Step S6 of the flowchart of FIG. 3 described above may be employed as the ignition timing.

FIG. 5 is a flowchart illustrating the fuel injection control according to the first embodiment.

In Step S11, the electronic control unit 200 reads the engine load detected by the load sensor 217 and the engine rotation speed calculated based on the output signal of the crank angle sensor 218, and detects the engine operation state.

In Step S12, the electronic control unit 200 refers the map created in advance and calculates the target injection amount and the target injection timing of fuel to be injected from the fuel injection valve 20 based on the engine operation state.

In Step S13, the electronic control unit 200 reads the ignition timing detected through the detection control of the ignition timing in a previous combustion cycle and calculates a deviation between the detected ignition timing and the target ignition timing set in advance according to the engine operation state as an ignition timing deviation ΔC.

In Step S14, the electronic control unit 200 determines whether or not an absolute value of the ignition timing deviation ΔC is less than a predetermined deviation. When the absolute value of the ignition timing deviation ΔC is less than the predetermined deviation, the electronic control unit 200 progresses to processing of Step S15. When the absolute value of the ignition timing deviation ΔC is equal to or greater than the predetermined deviation, the electronic control unit 200 progresses to processing of Step S16.

In Step S15, the electronic control unit 200 performs control such that the fuel supply device injects fuel of the target injection amount from the fuel injection valve 20 at the target injection timing.

In Step S16, the electronic control unit 200 corrects at least one of the target injection amount and the target injection timing such that the detected ignition timing becomes the target ignition timing. In the first embodiment, when the ignition timing deviation ΔC has a positive value, that is, when the detected ignition timing is delayed later than the target ignition timing, the electronic control unit 200 corrects the target injection timing to an advance side such that the detected ignition timing becomes the target ignition timing. When the ignition timing deviation ΔC has a negative value, that is, when the detected ignition timing is advanced more than the target ignition timing, the electronic control unit 200 corrects the target injection timing to a delay side such that the detected ignition timing becomes the target ignition timing.

According to the first embodiment described above, the electronic control unit 200 (control device) that controls the internal combustion engine 100 including the engine body 1, the fuel injection valve 20 configured to inject fuel into the combustion chamber of the engine body 1, and the knocking sensor 210 (vibration sensor) configured to detect vibration of the engine body 1 includes a fuel injection controller configured to control the injection amount and the injection timing of fuel to be injected from the fuel injection valve 20 to the target injection amount and the target injection timing set based on the engine operation state, and an ignition timing detection unit configured to detect the ignition timing of fuel based on the vibration component of the engine body 1 in the specific frequency bandwidth.

Then, the fuel injection controller is configured to correct at least one of the target injection amount and the target injection timing based on the ignition timing deviation ΔC between the ignition timing detected by the ignition timing detection unit and the target ignition timing according to the engine operation state. The specific frequency bandwidth is the bandwidth on the low frequency side of the frequency bandwidth where the engine body 1 undergoes the elastic vibration and the ratio of the combustion vibration component that is generated when the engine body 1 is subjected to combustion pressure to the vibration components detected by the knocking sensor 210 becomes equal to or greater than the predetermined value. Specifically, the specific frequency bandwidth is the frequency bandwidth of 0.1 kHz to 1.8 kHz, and preferably, the frequency bandwidth of 0.2 kHz to 0.8 kHz.

As described above, the ignition timing of fuel is detected based on the vibration component of the engine body 1 in the bandwidth where the ratio of the combustion vibration component that is generated when the engine body 1 is subjected to combustion pressure becomes equal to or greater than the predetermined value, whereby it is possible to detect the combustion vibration component included in the vibration detected by the knocking sensor 210 with high accuracy. For this reason, it is possible to detect the ignition timing of fuel with high accuracy.

Second Embodiment

A second embodiment of the disclosure will be described. The second embodiment is different from the first embodiment in that the bandwidth of the band-pass filter, that is, the specific frequency bandwidth is changed according to the engine rotation speed.

Figure 6:
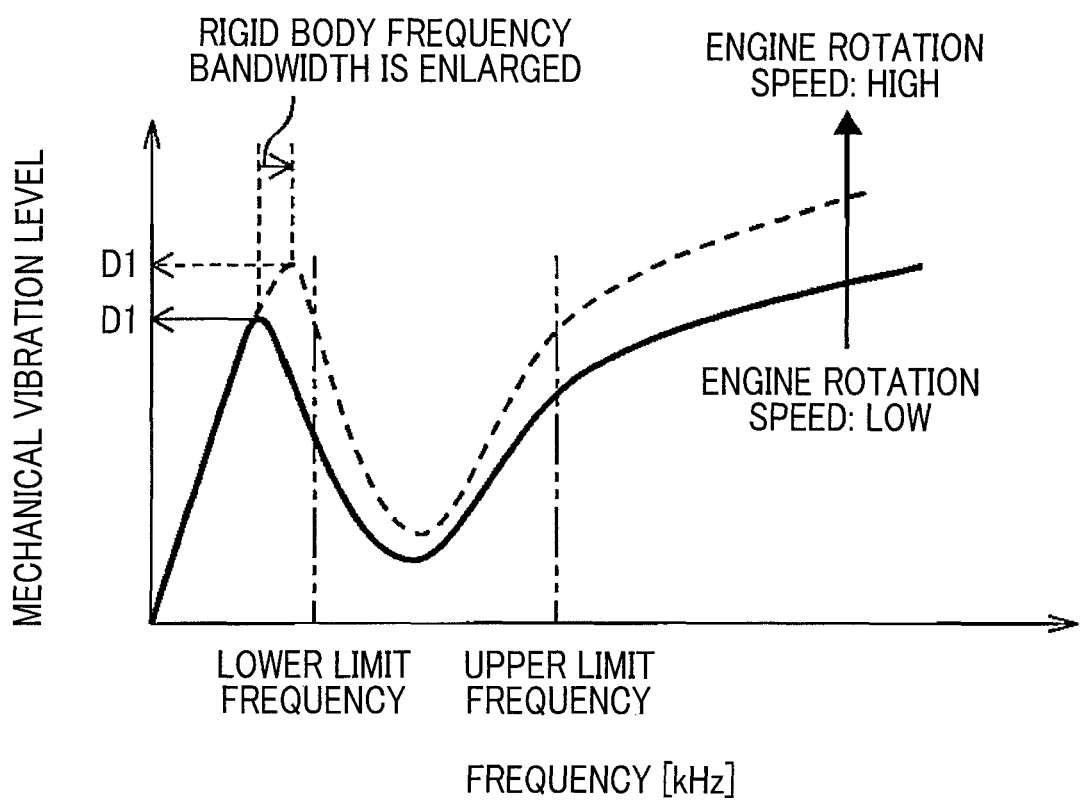
FIG. 6 is a graph comparing a mechanical vibration level in a frequency bandwidth of about 1.8 kHz or less when an engine rotation speed is low and when the engine rotation speed is high.

FIG. 6 is a graph comparing a mechanical vibration level in a frequency bandwidth of about 1.8 kHz or less when the engine rotation speed is low and when the engine rotation speed is high.

In the above-described first embodiment, the frequency bandwidth of about 0.1 kHz or less is set as the rigid body frequency bandwidth where the engine body 1 undergoes the rigid body vibration, and the frequency bandwidth of about 0.1 kHz to about 1.8 kHz of the elastic frequency bandwidth of about 0.1 kHz or more is set as the specific frequency bandwidth.

However, since the rigid body vibration primarily depends on vibration due to a component of a reciprocal rotation system, such as a piston, vibration of a rotational first order component, or the like, the rigid body frequency bandwidth is changed according to the engine rotation speed. Specifically, when the engine rotation speed is higher, the rigid body frequency bandwidth tends to be more expanded to a high frequency side.

For this reason, as shown in FIG. 6, when the engine rotation speed is high, a frequency at which the maximum value D1 is taken in the rigid body frequency bandwidth tends to be a frequency on a high frequency side. For this reason, a lower limit frequency (in the above-described first embodiment, about 0.2 kHz) of the specific frequency bandwidth tends to increase, and an upper limit frequency (in the above-described first embodiment, about 0.8 kHz) of the specific frequency bandwidth tends to decrease. As a result, a frequency bandwidth (in the above-described first embodiment, a frequency bandwidth of about 0.2 kHz to about 0.8 kHz) where the mechanical vibration level is particularly small tends to be made narrow, and a frequency bandwidth where the influence of the mechanical vibration is reduced tends to be made narrow as a whole.

In the second embodiment, when the engine rotation speed is higher, the bandwidth of the band-pass filter, that is, the specific frequency bandwidth is made narrower to detect the ignition timing. Hereinafter, detection control of the ignition timing according to the second embodiment will be described.

Figure 7:
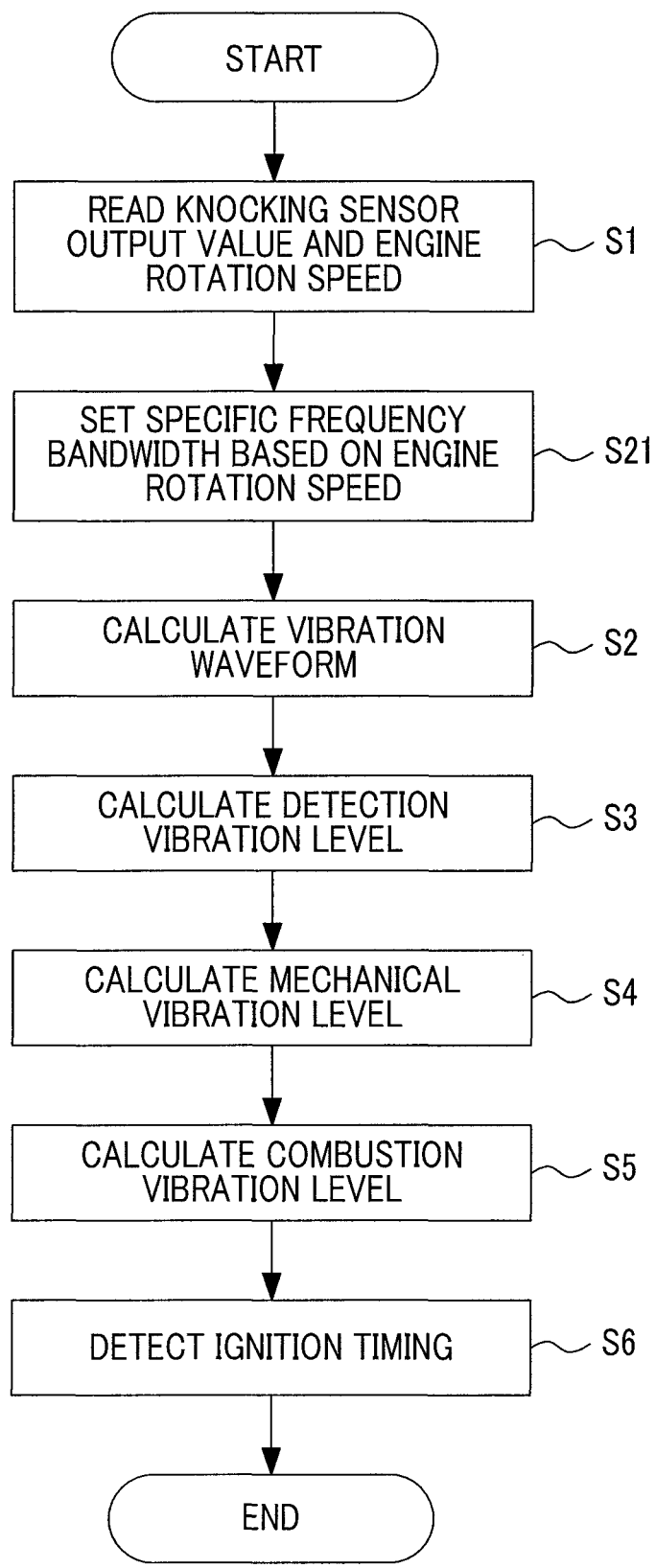
FIG. 7 is a flowchart illustrating detection control of an ignition timing according to a second embodiment of the disclosure.

FIG. 7 is a flowchart illustrating the detection control of the ignition timing according to the second embodiment. In FIG. 7, processing contents of Steps S1 to S6 are the same as those in the first embodiment, and thus, description will not be repeated herein.

In Step S21, the electronic control unit 200 sets the specific frequency bandwidth based on the engine rotation speed. Specifically, the electronic control unit 200 makes the lower limit frequency of the specific frequency bandwidth higher and makes the upper limit frequency of the specific frequency bandwidth lower when the engine rotation speed is higher, thereby narrowing the specific frequency bandwidth.

The ignition timing detection unit of the electronic control unit 200 according to the second embodiment described above is configured to make the specific frequency bandwidth narrower when the engine rotation speed is higher.

With this, it is possible to detect the combustion vibration component included in the vibration detected by the knocking sensor 210 with high accuracy in conformity with the rigid body frequency bandwidth that changes according to the engine rotation speed. For this reason, the same effects as in the first embodiment are obtained, and it is possible to detect the ignition timing of fuel with higher accuracy.

Third Embodiment

A third embodiment of the disclosure will be described. The third embodiment is different from the first embodiment in that a vibration portion (hereinafter, referred to as a "principal vibration portion") when fuel for generating requested torque is combusted is specified in a combustion vibration waveform to detect an ignition timing. Hereinafter, description will be provided focusing on the above-described difference.

In the respective embodiments described above, the timing at which the combustion vibration level becomes equal to or greater than the predetermined combustion determination threshold is detected as the ignition timing, that is, the combustion timing of fuel for generating requested torque. At this time, in order to restrain an increase timing of a combustion vibration level due to combustion of pilot injection fuel or the like other than fuel for generating requested torque from being erroneously detected as the ignition timing, there is a need to set the combustion determination threshold to a large value to a certain extent. However, when the combustion determination threshold is larger, since the ignition timing to be detected becomes a crank angle on a delay side with respect to an actual ignition timing, the detection accuracy of the ignition timing is degraded.

In the third embodiment, with the combustion vibration waveform being subjected to simplification processing, the principal vibration portion and other vibration portions, that is, a vibration portion by combustion of pilot injection fuel or the like other than fuel for generating requested torque are specified, and then, the ignition timing is detected.

Hereinafter, a detection method of the ignition timing according to the third embodiment will be described referring to FIGS. 8A and 8B.

Figure 8A:
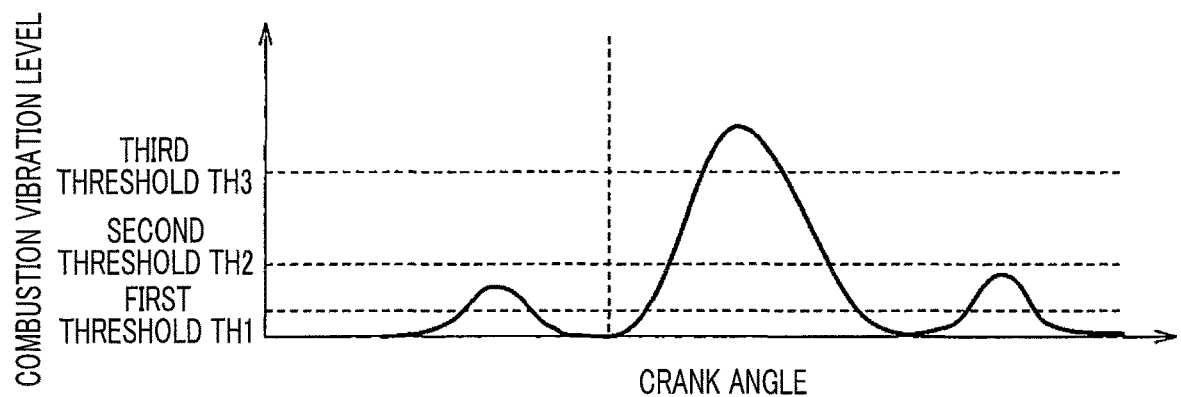
FIG. 8A is a graph showing a combustion vibration waveform obtained when multi-stage injection is carried out to make fuel be combusted by diffusive combustion in a certain engine operation state.

FIG. 8A is a graph showing a combustion vibration waveform obtained when the multi-stage injection is carried out to make fuel be combusted by diffusive combustion in a certain engine operation state. FIG. 8B is a graph showing a combustion vibration waveform subjected to simplification processing using three thresholds of a first threshold to a third threshold shown in FIG. 8A.

Figure 8B:
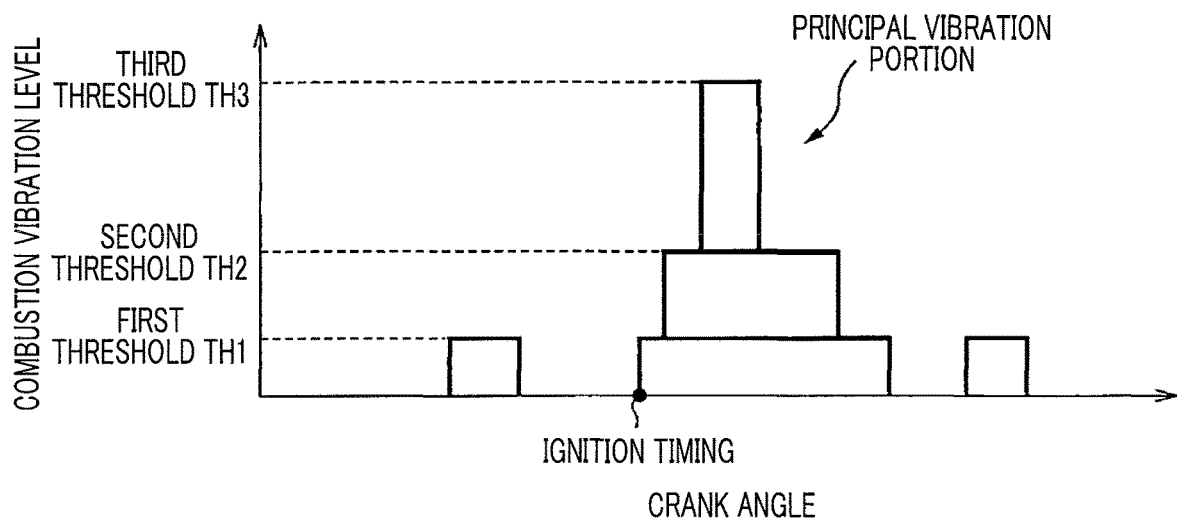
FIG. 8B is a graph showing a combustion vibration waveform subjected to simplification processing using three thresholds of a first threshold to a third threshold shown in FIG. 8A.

As shown in FIG. 8B, in the third embodiment, when the combustion vibration level is smaller than the first threshold, the combustion vibration level is set to zero, and when the combustion vibration level is equal to or greater than the first threshold and less than the second threshold, the combustion vibration level is set to the first threshold. When the combustion vibration level is equal to or greater than the second threshold and less than the third threshold, the combustion vibration level is set to the second threshold, and when the combustion vibration level is equal to or greater than the third threshold, the combustion vibration level is set to the third threshold.

With this, it is possible to obtain a combustion vibration waveform where a portion having the combustion vibration level equal to or greater than the first threshold and less than the second threshold appears as a vibration portion by combustion of pilot injection fuel or the like other than fuel for generating requested torque. It is possible to obtain a combustion vibration waveform where a portion having the combustion vibration level equal to or greater than the third threshold appears as a vibration portion by combustion of fuel for generating requested torque, that is, the principal vibration portion.

Here, the second threshold is a threshold that is set to a value comparatively higher than the combustion vibration level that is generated at the combustion timing of pilot injection fuel or at the combustion timing of after injection fuel, and is an example of the combustion determination threshold employed in the respective embodiments described above. Accordingly, in the third embodiment, it is possible to detect, as the ignition timing, a timing at which the combustion vibration level becomes equal to or greater than the first threshold smaller than the second threshold in the principal vibration portion. For this reason, it is possible to improve the detection accuracy of the ignition timing by making the combustion determination threshold small.

Figure 9:
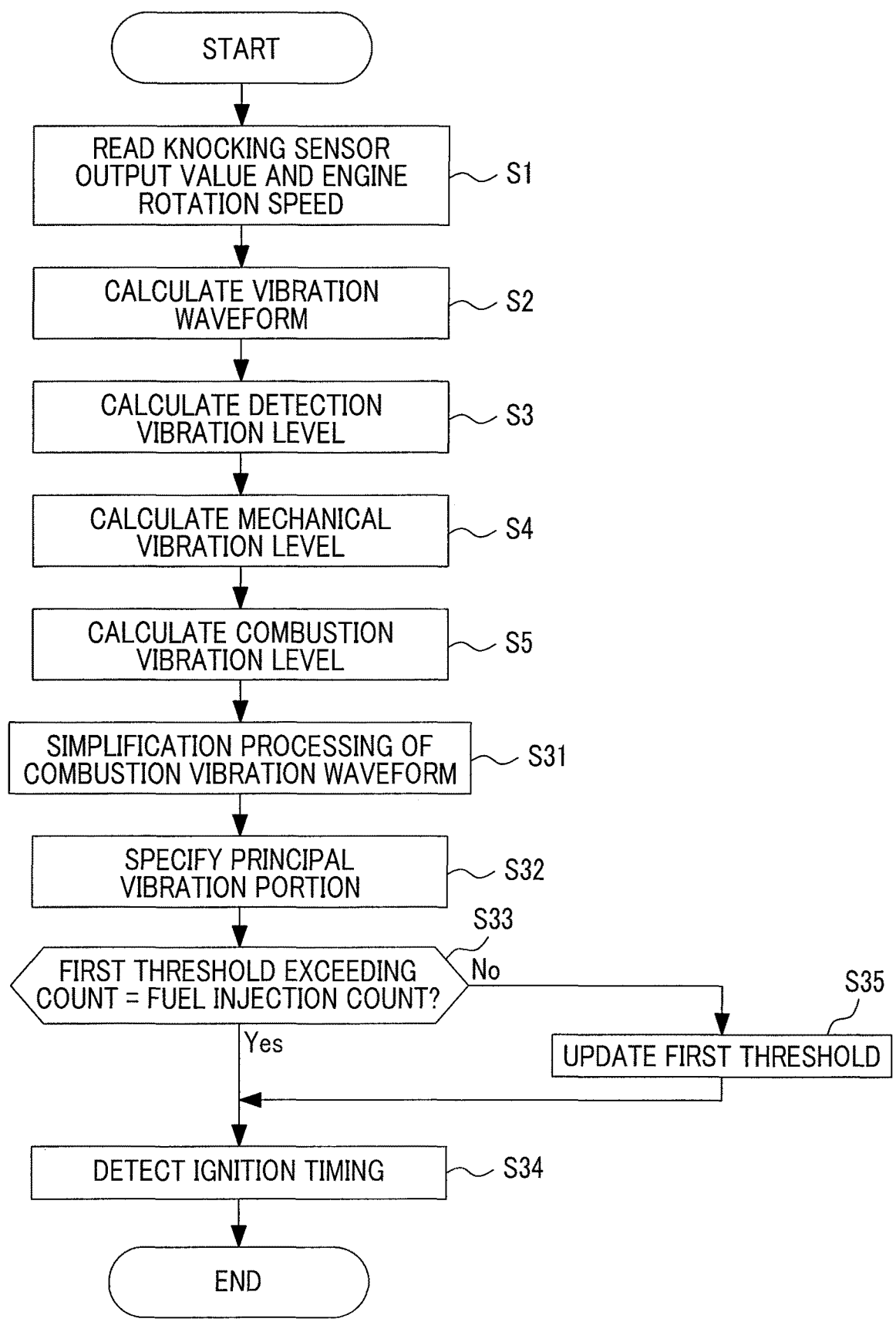
FIG. 9 is a flowchart illustrating detection control of an ignition timing according to a third embodiment of the disclosure.

FIG. 9 is a flowchart illustrating detection control of the ignition timing according to the third embodiment. In FIG. 9, processing contents of Steps S1 to S5 are the same as those in the first embodiment, and thus, description will not be repeated herein.

In Step S31, the electronic control unit 200 subjects the combustion vibration waveform to the simplification processing. Specifically, as described above, the electronic control unit 200 sets the combustion vibration level to zero when the combustion vibration level is smaller than the first threshold, and sets the combustion vibration level to the first threshold when the combustion vibration level is equal to or greater than the first threshold and less than the second threshold. When the combustion vibration level is equal to or greater than the second threshold and less than the third threshold, the combustion vibration level is set to the second threshold, and when the combustion vibration level is equal to or greater than the third threshold, the combustion vibration level is set to the third threshold.

In Step S32, the electronic control unit 200 specifies a portion having the combustion vibration level equal to or greater than the third threshold as the principal vibration portion.

In Step S33, the electronic control unit 200 determines whether or not the number of portions (hereinafter, referred to as a "first threshold exceeding count") having the combustion vibration level equal to or greater than the first threshold and less than the second threshold coincides with a fuel injection count.

For example, when the multi-stage injection is carried out, the first threshold exceeding count should coincide with the fuel injection count; however, when the first threshold exceeding count is greater than the fuel injection count, determination can be made that the first threshold is too small, and there is a portion having the combustion vibration level equal to or greater than the first threshold and less than the second threshold due to the influence of noise. When the first threshold exceeding count is smaller than the fuel injection count, determination can be made that the first threshold is too large. When the first threshold exceeding count does not coincide with the fuel injection count, the electronic control unit 200 progresses to processing of Step S35 in order to update the value of the first threshold by increasing or decreasing the value of the first threshold by a predetermined value. When the first threshold exceeding count coincides with the fuel injection count, the electronic control unit 200 progresses to processing of Step S34 without updating the value of the first threshold.

In Step S34, the electronic control unit 200 detects, as the ignition timing, a crank angle at which the combustion vibration level becomes equal to or greater than the first threshold in the principal vibration portion.

In Step S35, the electronic control unit 200 updates the value of the first threshold. Specifically, the electronic control unit 200 increases the value of the first threshold by the predetermined value when the first threshold exceeding count is greater than the fuel injection count, and decreases the value of the first threshold by the predetermined value when the first threshold exceeding count is smaller than the fuel injection count.

According to the third embodiment described above, it is possible to specify a principal vibration portion based on a combustion vibration waveform simplified using a plurality of thresholds (in the third embodiment, the first threshold to the third threshold). For this reason, it is possible to detect, as the ignition timing, a timing at which the combustion vibration level becomes equal to or greater than the combustion determination threshold in the principal vibration portion to the exclusion of the influence of the multi-stage injection. For this reason, it is possible to improve the detection accuracy of the ignition timing by making the combustion determination threshold small.

Fourth Embodiment

A fourth embodiment of the disclosure will be described. The fourth embodiment is different from the first embodiment in that premix charged compressive ignition is carried out in a predetermined operation region to perform the operation of the engine body 1. Hereinafter, description will be provided focusing on the above-described difference.

The electronic control unit 200 according to the fourth embodiment switches an operation mode of the engine body 1 to one of a premix charged compressive ignition mode (hereinafter, referred to as a "PCCI mode") and a diffusive combustion mode (hereinafter, referred to as a "DC mode") based on the engine operation state and performs the operation of the engine body 1.

Figure 10:
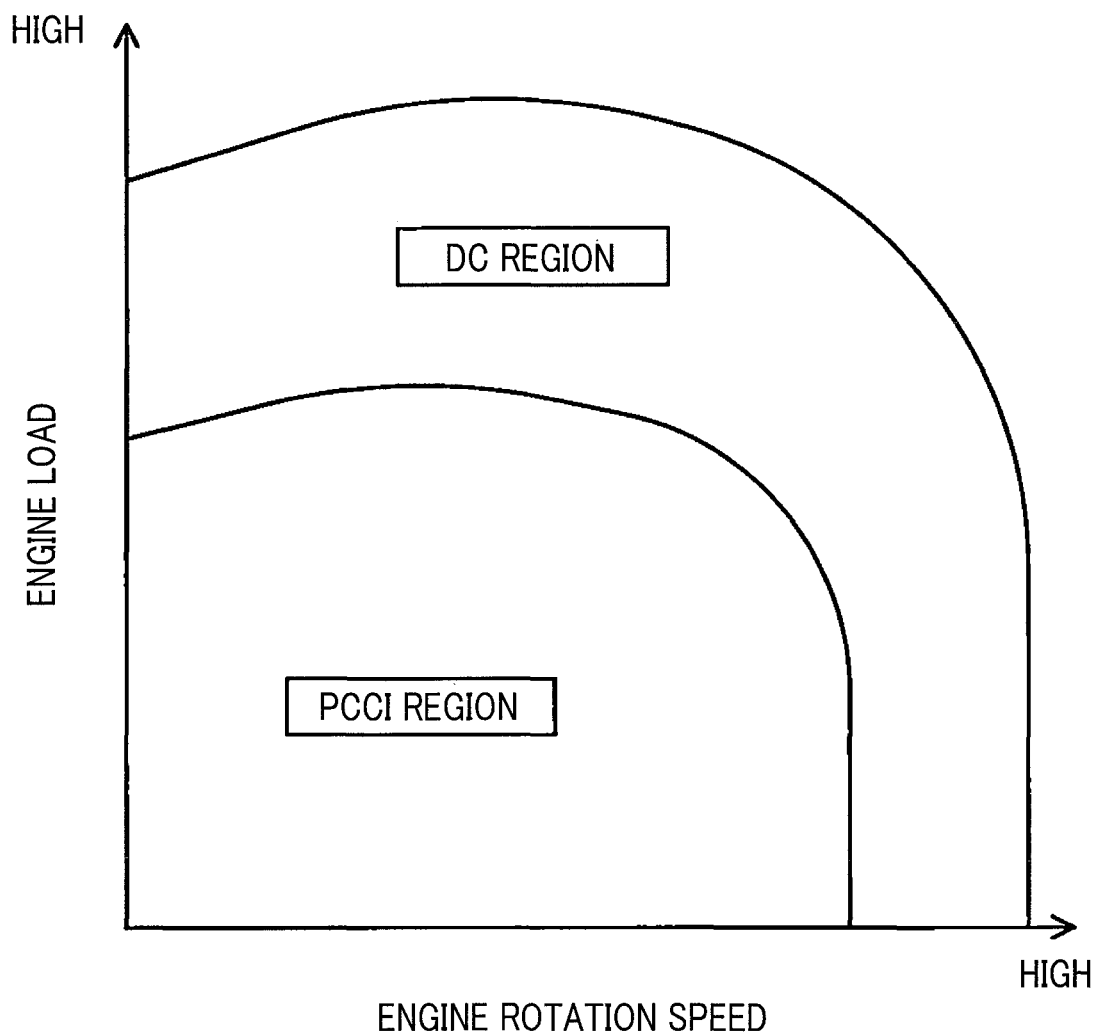
FIG. 10 is a graph showing an operation region of an engine body.

As shown in FIG. 10, the electronic control unit 200 switches the operation mode to the PCCI mode when the engine operation state is within a PCCI range on a low rotation speed and low load side, and switches the operation mode to the DC mode when the engine operation state is within a DC region on a high rotation speed and high load side. Then, the electronic control unit 200 carries out control of each control component according to each operation mode and performs the operation of the engine body 1.

Specifically, when the operation mode is the DC MODE, as in the above-described first embodiment, the electronic control unit 200 performs the operation of the engine body 1 by carrying out the multi-stage injection and controlling the injection amount, the injection timing, and the like of respective fuel to be injected from the fuel injection valve 20 in a multi-stage manner such that fuel injected into the combustion chamber by the main injection is combusted with a short ignition delay time without substantial delay after the fuel injection.

When the operation mode is the PCCI MODE, the electronic control unit 200 performs the operation of the engine body 1 by controlling the injection amount, the injection timing, and the like of fuel to be injected from the fuel injection valve 20 so as to cause the premix charged compressive ignition where fuel injected into the combustion chamber is combusted after a certain premixing period with air from the fuel injection (that is, with an ignition delay time longer than during the diffusive combustion after fuel injection).

As described above, when the operation of the engine body 1 is performed while switching the operation mode to a plurality of operation modes having different combustion forms, the combustion vibration waveform may be changed according to the operation mode.

Figure 11:
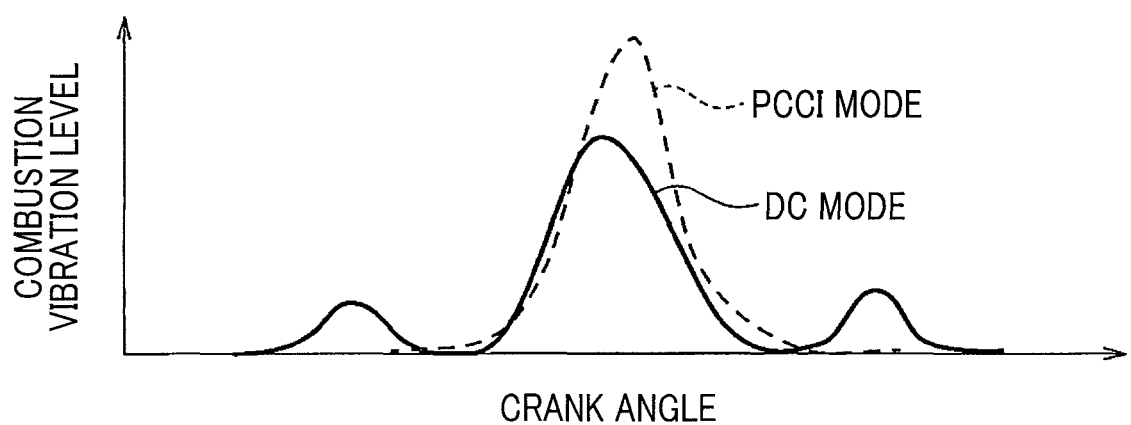
FIG. 11 is a graph comparing a combustion vibration waveform in a certain engine operation state during a DC mode and during a PCCI mode.

FIG. 11 is a graph comparing a combustion vibration waveform in a certain engine operation state during DC MODE and during PCCI MODE.

As shown in FIG. 11, in the fourth embodiment, since the multi-stage injection is carried out during DC MODE, the combustion vibration level is high even at the combustion timing of pilot injection fuel or at the combustion timing of after injection fuel, in addition to the combustion timing of main injection fuel.

Accordingly, as described above, during DC MODE, in order to detect the combustion timing of main injection fuel as the ignition timing, there is a need to set the combustion determination threshold to be higher than the combustion vibration level at the combustion timing of pilot injection fuel or at the combustion timing of after injection fuel.

In contrast to DC MODE, during PCCI MODE, since a premix is combusted at the same timing at multiple points, basically, the combustion vibration level is high solely at a combustion timing of the premix. For this reason, during PCCI MODE, unlike DC MODE, there is no need to increase the combustion determination threshold. Conversely, when the combustion determination threshold during PCCI MODE is the same as the combustion determination threshold during DC MODE, the ignition timing to be detected becomes a crank angle on the delay side by an amount when the combustion determination threshold is the same, compared to an actual ignition timing, and the detection accuracy of the ignition timing is deteriorated.

In the fourth embodiment, the combustion determination threshold is changed during PCCI MODE and during DC MODE. Specifically, the combustion determination threshold is smaller during PCCI MODE than during DC MODE. With this, it is possible to improve the detection accuracy of the ignition timing during PCCI MODE. Hereinafter, detection control of the ignition timing according to the fourth embodiment will be described.

Figure 12:
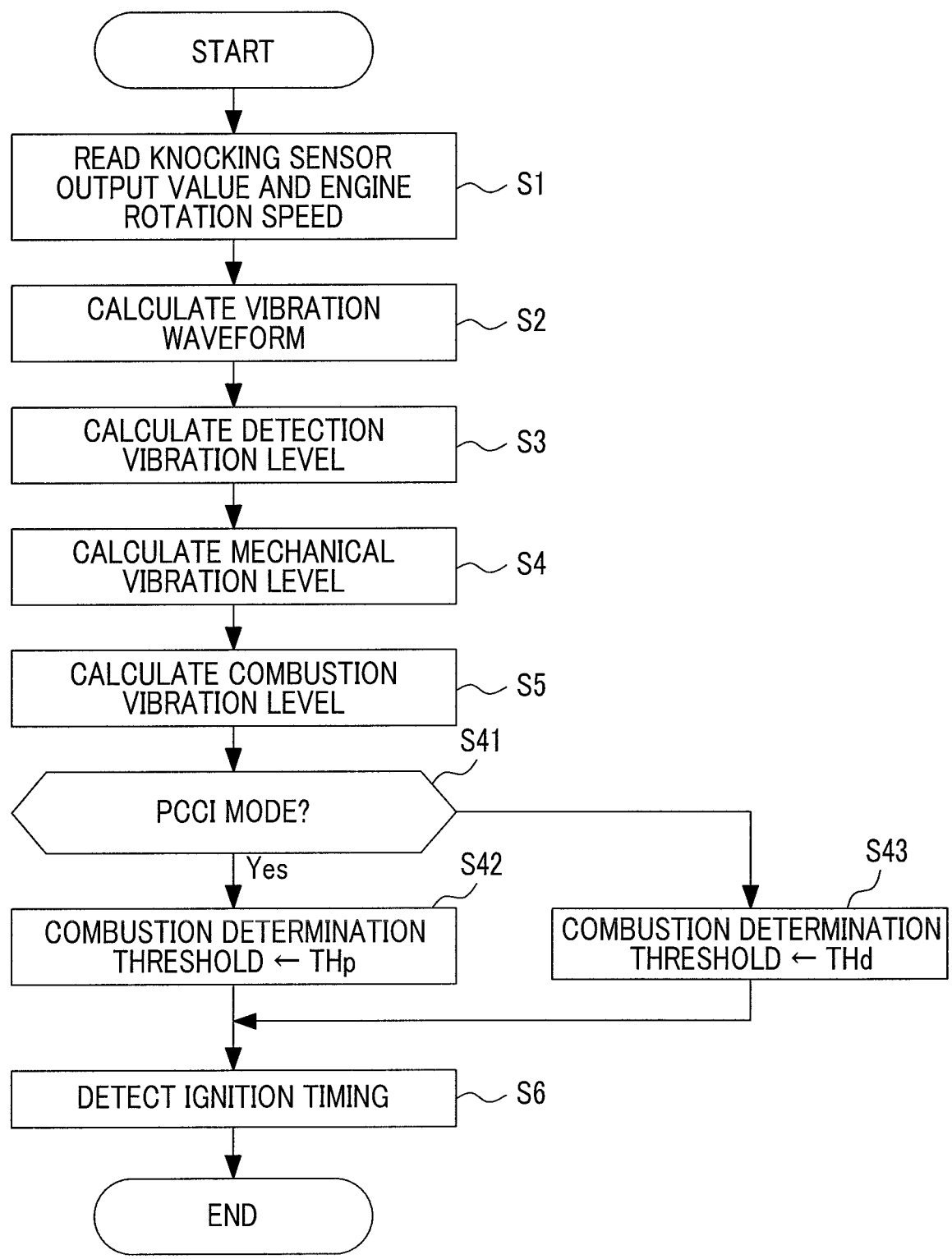
FIG. 12 is a flowchart illustrating detection control of an ignition timing according to a fourth embodiment of the disclosure.

FIG. 12 is a flowchart illustrating the detection control of the ignition timing according to the fourth embodiment. In FIG. 12, processing contents of Steps S1 to S6 are the same as those in the first embodiment, and thus, description will not be repeated herein.

In Step S41, the electronic control unit 200 determines whether a current operation mode is PCCI MODE or DC MODE. When the operation mode is PCCI MODE, the electronic control unit 200 progresses to processing of Step S42. When the operation mode is DC MODE, the electronic control unit 200 progresses to processing of Step S43.

In Step S42, the electronic control unit 200 sets the combustion determination threshold to a threshold (hereinafter, referred to as a "PCCI determination threshold") THp for PCCI MODE.

In Step S43, the electronic control unit 200 sets the combustion determination threshold to a threshold (hereinafter, referred to as a "DC determination threshold") THd for DC MODE. The DC determination threshold THd is a value greater than the PCCI determination threshold THp.

According to the fourth embodiment described above, when fuel is combusted by the premix charged compressive ignition, it is possible to make the combustion determination threshold smaller than when fuel is combusted by the diffusive combustion. For this reason, it is possible to detect the ignition timing when fuel is combusted by the premix charged compressive ignition, with high accuracy.

Since an operation region when fuel is combusted by the premix charged compressive ignition is a region on a low load side, a vibration component (combustion vibration component) due to combustion is likely to be small compared to a region on a high load side. However, according to the fourth embodiment, it is possible to extract a combustion vibration component even in the operation region on the low load side described above to the exclusion of the influence of a mechanical vibration component as much as possible. For this reason, it is possible to detect the ignition timing of the premix charged compressive ignition that is carried out in the operation region on the low load side, with high accuracy.

Fifth Embodiment

A fifth embodiment of the disclosure will be described. The fifth embodiment is different from the fourth embodiment in that a combustion form is discriminated and the combustion determination threshold is changed according to the combustion form. Hereinafter, description will be provided focusing on the above-described difference.

In the fourth embodiment described above, the combustion determination threshold is changed according to the operation mode. However, in the fifth embodiment, a combustion form, that is, whether the diffusive combustion or the premix charged compressive ignition is performed is discriminated based on the combustion vibration waveform and the combustion determination threshold is changed according to a discrimination result. Hereinafter, a discrimination method of the combustion form according to the fifth embodiment will be described.

Figure 13A:
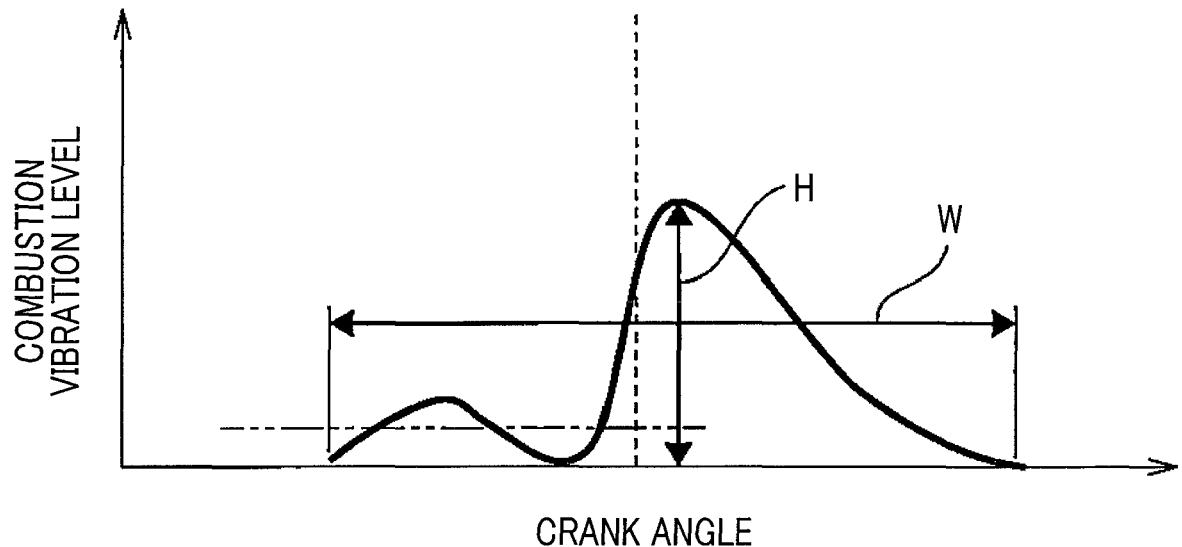
FIG. 13A is a graph showing a combustion vibration waveform during diffusive combustion in a certain engine operation state.
Figure 13B:
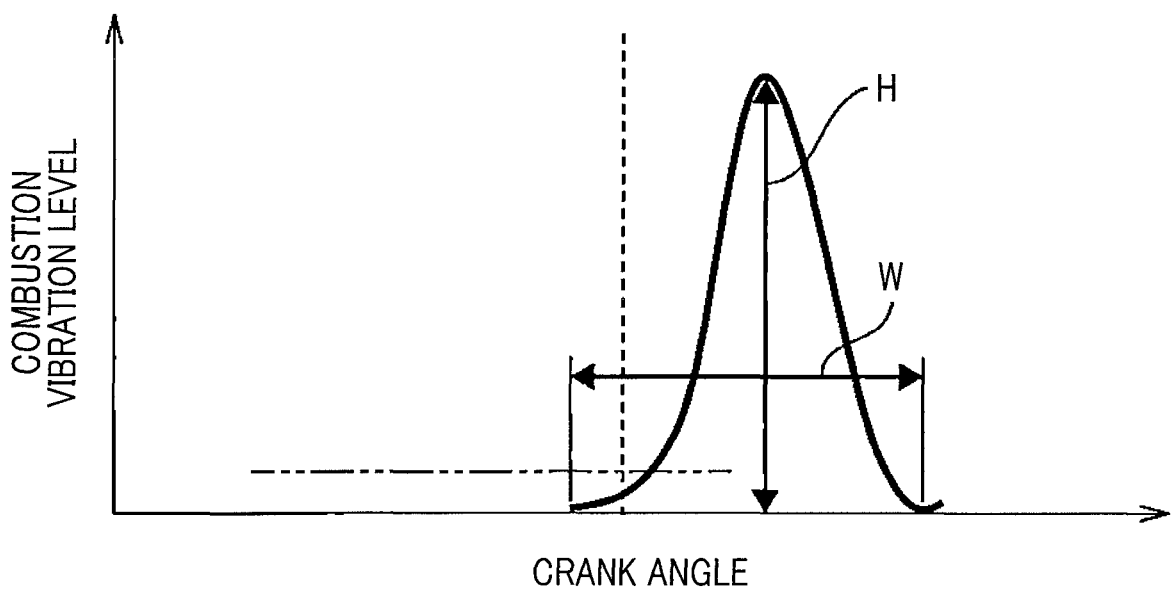
FIG. 13B is a graph showing a combustion vibration waveform during premix charged compressive ignition in a certain engine operation state.

FIG. 13A is a graph showing a combustion vibration waveform during diffusive combustion in a certain engine operation state. FIG. 13B is a graph showing a combustion vibration waveform during premix charged compressive ignition in a certain engine operation state.

As shown in FIGS. 13A and 13B, the combustion vibration waveform during the diffusive combustion tends to be longer in vibration period W and smaller in maximum value H of the combustion vibration level than the combustion vibration waveform during the premix charged compressive ignition. For this reason, a ratio H/W of the maximum value H of the combustion vibration level to the vibration period W tends to be small during the diffusive combustion, and tends to be large during the premix charged compressive ignition.

In the fifth embodiment, when the ratio H/W is less than a predetermined ratio, determination is made that fuel is combusted by the diffusive combustion and the combustion determination threshold is set to the DC determination threshold THd. When the ratio H/W is equal to or greater than the predetermined ratio, determination is made that fuel is combusted by the premix charged compressive ignition and the combustion determination threshold is set to the PCCI determination threshold THp. Hereinafter, detection control of the ignition timing according to the fifth embodiment will be described.

Figure 14:
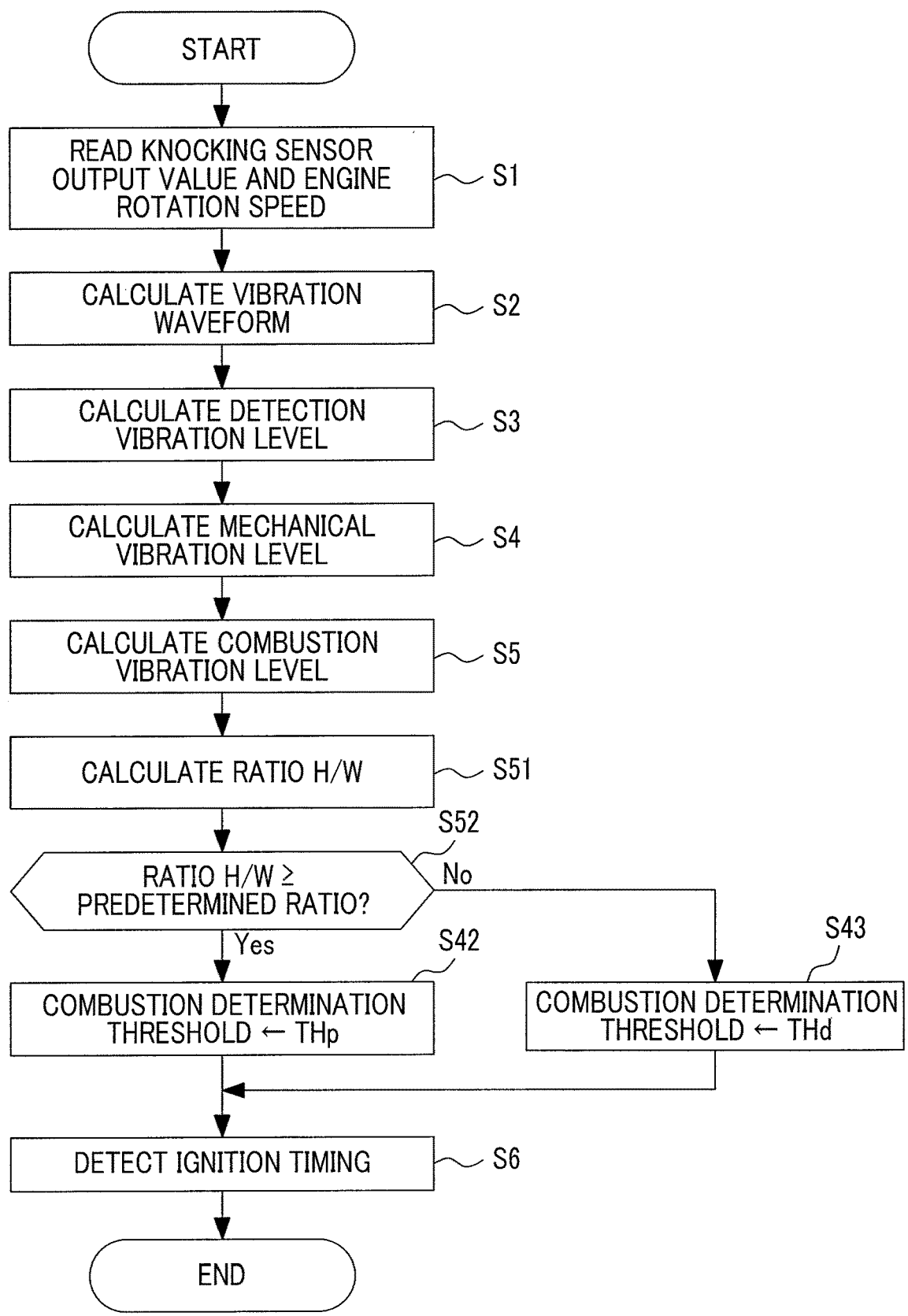
FIG. 14 is a flowchart illustrating detection control of an ignition timing according to a fifth embodiment of the disclosure.

FIG. 14 is a flowchart illustrating the detection control of the ignition timing according to the fifth embodiment. In FIG. 14, processing contents of Steps S1 to S6, S42, and S43 are the same as those in the first embodiment and the fourth embodiment, and thus, description will not be repeated herein.

In Step S51, the electronic control unit 200 detects the vibration period W of the combustion vibration waveform and the maximum value H of the combustion vibration level based on the combustion vibration waveform and calculates the ratio H/W.

In Step S52, the electronic control unit 200 determines whether or not the ratio H/W is equal to or greater than the predetermined ratio. When the ratio H/W is equal to or greater than the predetermined ratio, the electronic control unit 200 progresses to the processing of Step S42. When the ratio H/W is less than the predetermined ratio, the electronic control unit 200 progresses to the processing of Step S43.

According to the fifth embodiment described above, as in the fifth embodiment, when fuel is combusted by the premix charged compressive ignition, it is possible to make the combustion determination threshold smaller than when fuel is combusted by the diffusive combustion. For this reason, it is possible to detect the ignition timing when fuel is combusted by the premix charged compressive ignition, with high accuracy.

Sixth Embodiment

A sixth embodiment of the disclosure will be described. The sixth embodiment is different from the fifth embodiment in that the discrimination method of the combustion form is different. Hereinafter, description will be provided focusing on the above-described difference.

Figure 15A:
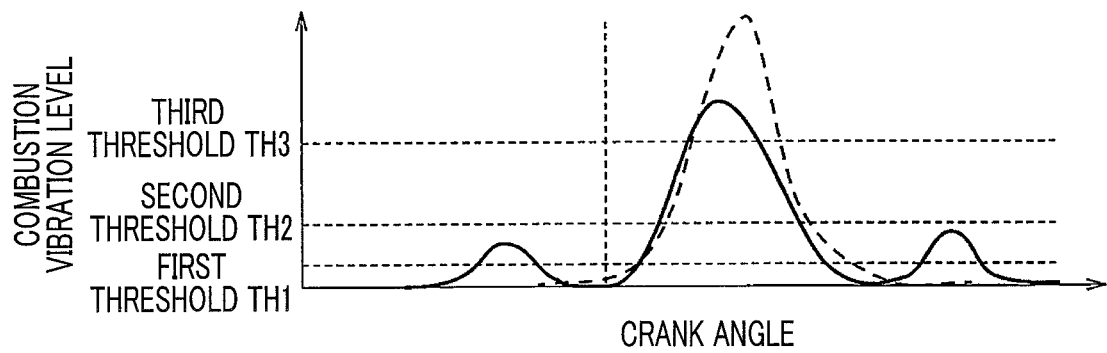
FIG. 15A is a graph comparing a combustion vibration waveform in a certain engine operation state during diffusive combustion and during premix charged compressive ignition.

FIG. 15A is a diagram similar to FIGS. 13A and 13B, and is a graph comparing a combustion vibration waveform in a certain engine operation state during diffusive combustion and during premix charged compressive ignition.

Figure 15B:
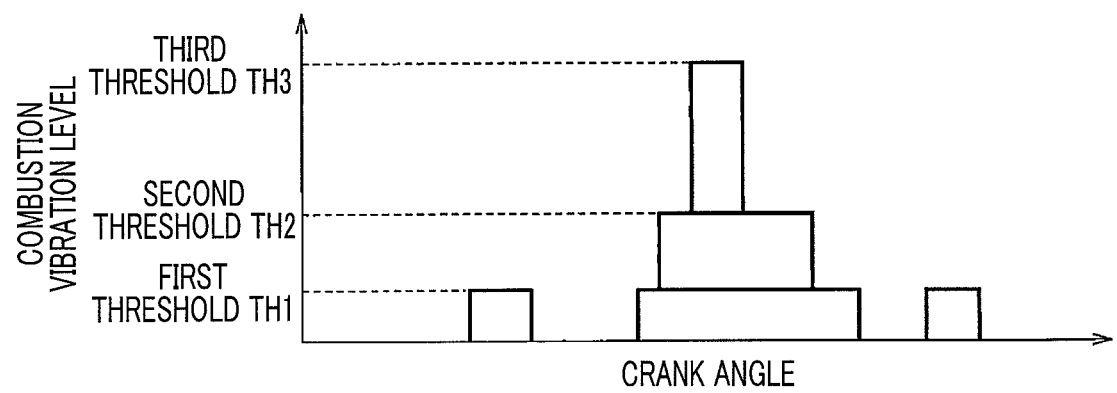
FIG. 15B is a graph showing a combustion vibration waveform during diffusive combustion subjected to simplification processing using three thresholds of a first threshold to a third threshold shown in FIG. 15A.
Figure 15C:
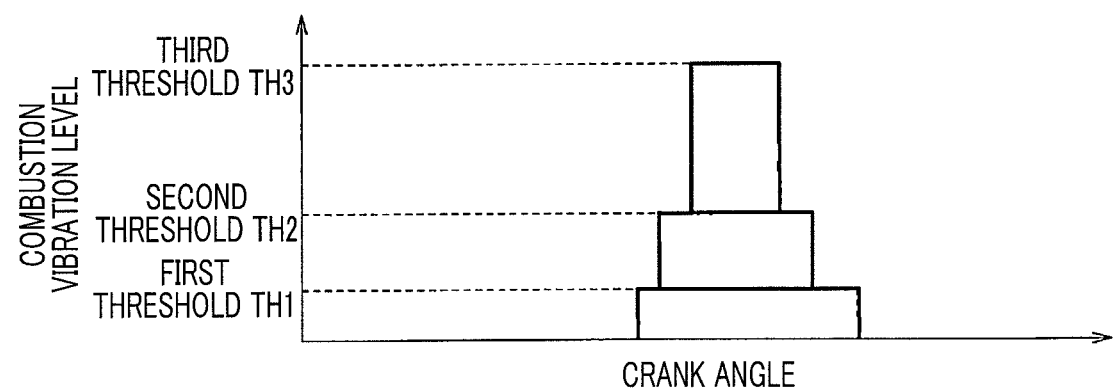
FIG. 15C is a graph showing a combustion vibration waveform during premix charged compressive ignition subjected to simplification processing using the three thresholds of the first threshold to the third threshold shown in FIG. 15A.

FIGS. 15B and 15C are graphs showing combustion vibration waveforms diffusive combustion and premix charged compressive ignition subjected to simplification processing using three thresholds of a first threshold and a third threshold shown in FIG. 15A, respectively.

As shown in FIG. 15B, the combustion vibration waveform is subjected to the simplification processing, whereby, during the diffusive combustion, it is possible to obtain a combustion vibration waveform where a vibration portion (principal vibration portion) generated by combustion of fuel for generating requested torque and a vibration portion to be generated by combustion of pilot injection fuel other than fuel for generating requested torque appear. As shown in FIG. 15C, during the premix charged compressive ignition, solely the principal vibration portion appears.

For this reason, the combustion form can be discriminated by the number of portions (first threshold exceeding count) where the combustion vibration level is equal to or greater than the first threshold and less than the second threshold. In the sixth embodiment, the combustion form is discriminated according to the first threshold exceeding count and the combustion determination threshold is changed according to the combustion form. Hereinafter, detection control of the ignition timing according to the sixth embodiment will be described.

Figure 16:
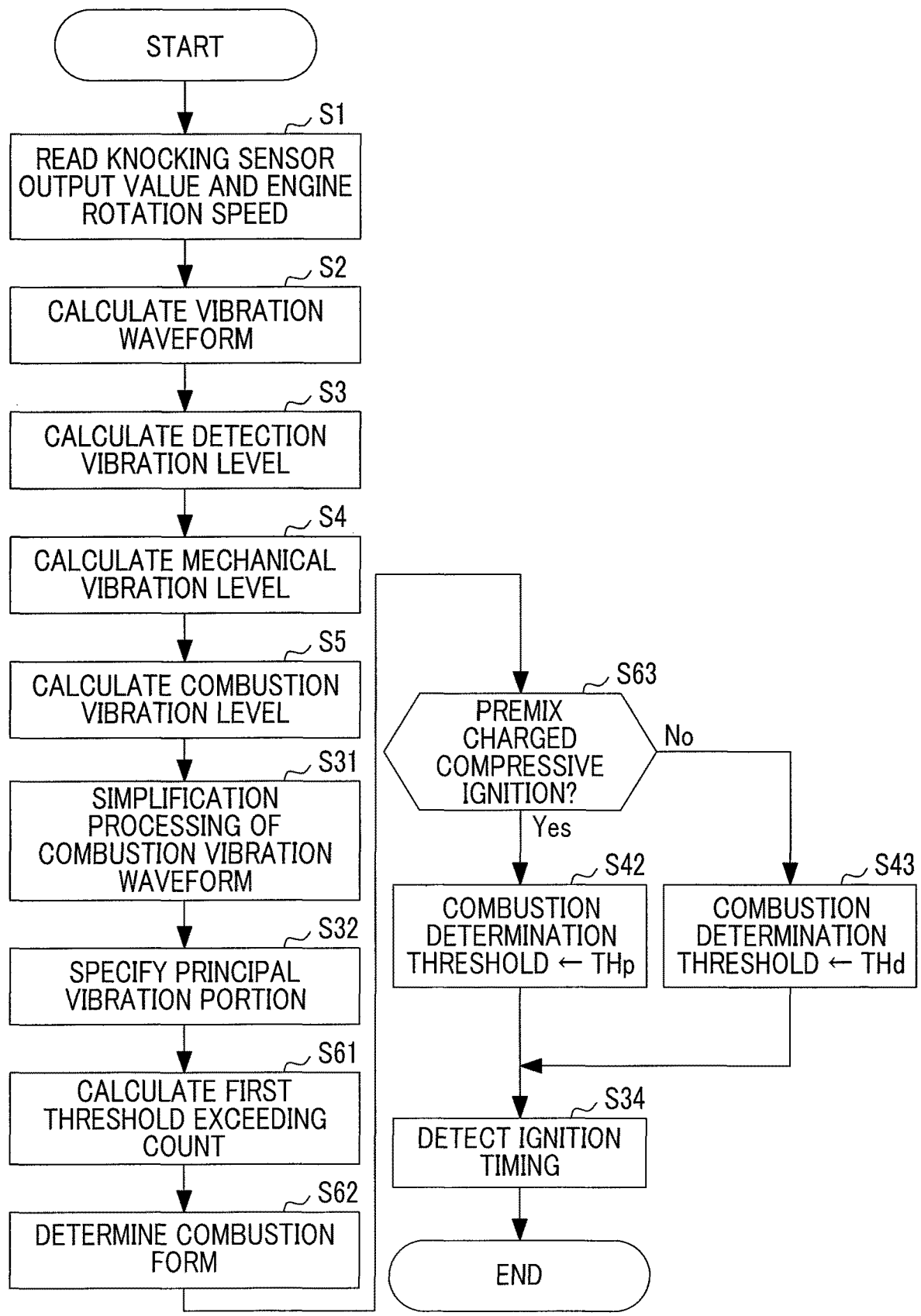
FIG. 16 is a flowchart illustrating detection control of an ignition timing according to a sixth embodiment of the disclosure.

FIG. 16 is a flowchart illustrating the detection control of the ignition timing according to the sixth embodiment. In FIG. 16, processing contents of Steps S1 to S5, S31, S32, S34, S42, and S43 are the same as those in the first embodiment, the third embodiment, and the fourth embodiment, and thus, description will not be repeated herein.

In Step S61, the electronic control unit 200 calculates the first threshold exceeding count.

In Step S62, the electronic control unit 200 discriminates the combustion form based on the first threshold exceeding count. In the sixth embodiment, the electronic control unit 200 discriminates the combustion form is the premix charged compressive ignition when the first threshold exceeding count is one, and discriminates that the combustion form is the diffusive combustion when the first threshold exceeding count is plural.

In Step S63, the electronic control unit 200 progresses to the processing of Step S42 when the combustion form is the premix charged compressive ignition, and progresses to the processing of Step S43 when the combustion form is the diffusive combustion.

According to the sixth embodiment described above, as in the fifth embodiment, when fuel is combusted by the premix charged compressive ignition, it is possible to make the combustion determination threshold smaller than when fuel is combusted by the diffusive combustion. For this reason, it is possible to detect the ignition timing when fuel is combusted by the premix charged compressive ignition, with high accuracy.

Seventh Embodiment

A seventh embodiment of the disclosure will be described. The seventh embodiment is different from the first embodiment in that the combustion vibration level is corrected based on a moving average value of the ignition timing deviation ΔC. Hereinafter, description will be provided focusing on the above-described difference.

As a factor for the ignition timing deviation ΔC, as described above, in addition to the filter processing to the output value of the knocking sensor 210, change in ignition delay time is exemplified.

As a factor for change in ignition delay time, there are a temporary factor and a permanent factor. As the temporary factor, for example, during a transient operation where an engine load is changed, deviation of an intake air amount from a target value due to a response delay of intake air, change in octane number or octane number of fuel due to refueling, or the like is exemplified. As the permanent factor, fluctuation of an injection amount to be injected from the fuel injection valve 20 due to aging deterioration of the fuel supply device, or the like is exemplified.

In the seventh embodiment, deviation of the ignition timing due to temporary change in ignition delay time is compensated based on a moving average value (hereinafter, referred to as a "short-term moving average value") of the ignition timing deviation ΔC for a short period, and deviation of the ignition timing due to permanent change in ignition delay time is compensated based on a moving average value (hereinafter; referred to as a "long-term moving average value") of the ignition timing deviation ΔC for a long period. Hereinafter, detection control of the ignition timing according to the seventh embodiment will be described.

Figure 17:
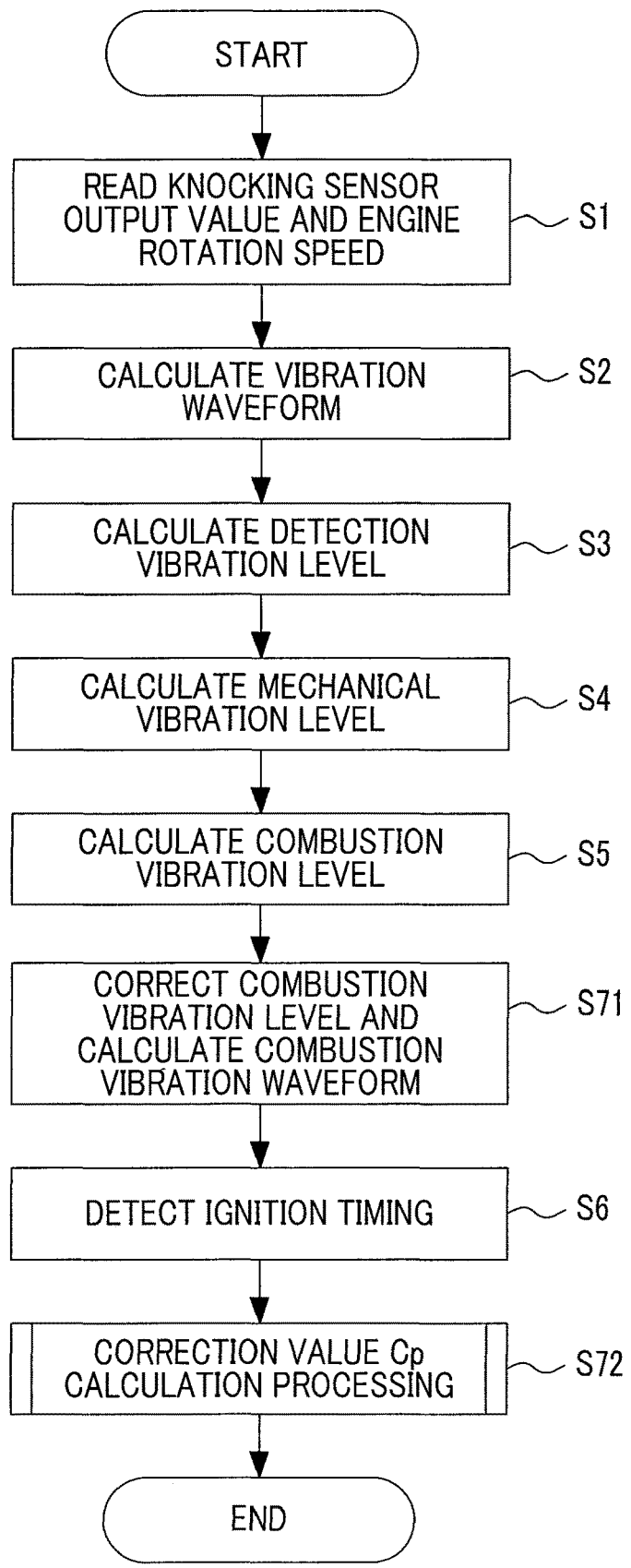
FIG. 17 is a flowchart illustrating detection control of an ignition timing according to a seventh embodiment of the disclosure.

FIG. 17 is a flowchart illustrating the detection control of the ignition timing according to the seventh embodiment. In FIG. 17, processing contents of Steps S1 to S6 are the same as those in the first embodiment, and thus, description will not be repeated herein.

In Step S71, the electronic control unit 200 reads a correction value Cp calculated through correction value calculation processing described below, adds the correction value Cp to the combustion vibration level to correct the combustion vibration level, and calculates a waveform (combustion vibration waveform) of the combustion vibration level at each crank angle. An initial value of the correction value Cp is zero.

In Step S72, the electronic control unit 200 carries out the correction value calculation processing. Details of the correction value calculation processing will be described below referring to FIG. 18.

Figure 18:
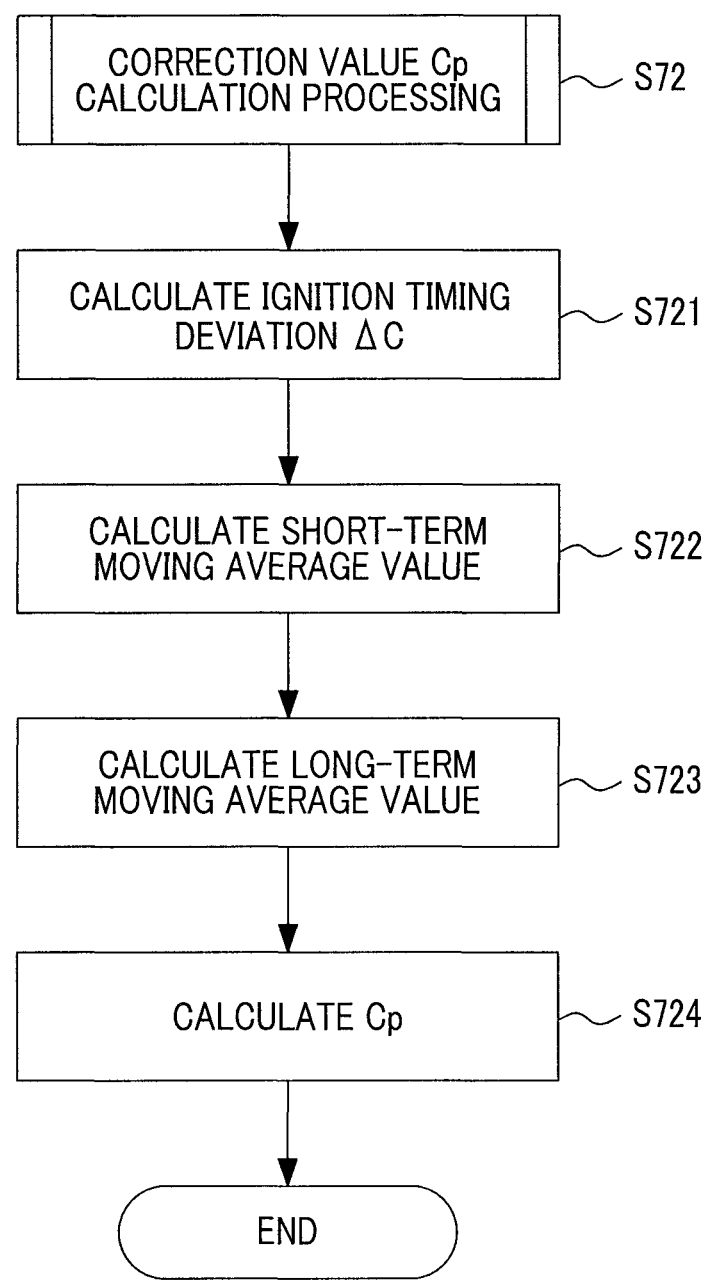
FIG. 18 is a flowchart illustrating correction value calculation processing.

FIG. 18 is a flowchart illustrating the correction value calculation processing.

In Step S721, the electronic control unit 200 calculates a deviation between the ignition timing detected in Step S6 and the target ignition timing set in advance according to the engine operation state as the ignition timing deviation ΔC.

In Step S722, the electronic control unit 200 calculates a short-term moving average value CS of the ignition timing deviation ΔC based on Expression (1) described below.

$$CS = \sum_{i=N-n}^{N} \frac{\Delta C}{N-n} \quad (1)$$

In Step S723, the electronic control unit 200 calculates a long-term moving average value CL of the ignition timing deviation ΔC based on Expression (2) described below.

$$CL = \sum_{i=0}^{N} \frac{\Delta C}{N} \quad (2)$$

In Step S724, the electronic control unit 200 calculates a value obtained by multiplying a value obtained by adding the short-term moving average value CS and the long-term moving average value CL by a predetermined coefficient k as the correction value Cp(=k×(CS+CL)).

Accordingly, in the seventh embodiment, when the correction value Cp is greater, that is, when the detected ignition timing is delayed with respect to the target ignition timing, it is possible to correct the combustion vibration level to be higher. With this, since it is possible to correct deviation of the ignition timing due to temporary and permanent changes in ignition delay time, it is possible to detect the ignition timing with high accuracy.

Although the embodiments of the disclosure have been described above, the embodiments merely show a part of application examples of the disclosure, and are not meant to limit the technical scope of the disclosure to the specific configurations of the embodiments.

For example, until the knocking sensor 210 detects the combustion vibration, a delay according to a propagation speed (sonic speed) of vibration occurs. The propagation speed of vibration is changed according to a temperature of the engine body 1. Specifically, when the temperature of the engine body 1 is higher, the propagation speed of vibration is later and the delay is greater.

Accordingly, for example, when a temperature of a coolant representative of the temperature of the engine body 1 is higher, the ignition timing detected in Step S6 of the flowchart of FIG. 3 may be corrected to the advance side.

In the respective embodiments described above, although the single knocking sensor 210 is attached to the engine body 1, two or more knocking sensors 210 may be attached, the first knocking sensor may be set as a main sensor, and the second knocking senor may be set as a sub-sensor. In this way, the output values of the sensors may be monitored and determination may be made whether or not an abnormality occurs in the sensors. Then, when an abnormality occurs in the main sensor, the ignition timing may be allowed to be detected by the sub-sensor.

In the second embodiment, when the engine rotation speed is higher, the specific frequency bandwidth is made narrower. However, even though the reference frequency during the envelope processing in Step S3 of the flowchart of FIG. 3 described above is set to be higher when the engine rotation speed is higher, the same effects are obtained.

What is claimed is:

1. A control device for an internal combustion engine including an engine body, a fuel injection valve configured to inject fuel into a combustion chamber of the engine body, and a vibration sensor configured to detect vibration of the engine body, the control device comprising an electronic control unit configured to: set a target injection amount and a target injection timing based on an engine operation state; control an injection amount and an injection timing of fuel to be injected from the fuel injection valve to the target injection amount and the target injection timing, respectively; detect an ignition timing of fuel based on a vibration component of the engine body in a specific frequency bandwidth, the specific frequency bandwidth being a bandwidth on a low frequency side of a frequency bandwidth where the engine body undergoes elastic vibration, and the specific frequency bandwidth being a bandwidth where a ratio of a combustion vibration component that is generated when the engine body is subjected to combustion pressure to vibration components detected by the vibration sensor becomes equal to or greater than a predetermined value; and correct at least one of the target injection amount and the target injection timing based on a deviation between the detected ignition timing and a target ignition timing according to the engine operation state, wherein the specific frequency bandwidth is a frequency bandwidth of 0.1 kHz to 1.8 kHz.

2. The control device according to claim 1, wherein the specific frequency bandwidth is a frequency bandwidth of 0.2 kHz to 0.8 kHz.

3. The control device according to claim 1, wherein the electronic control unit is configured to make the specific frequency bandwidth narrower when an engine rotation speed is higher.

4. The control device according to claim 1, wherein:
the electronic control unit is configured to calculate a vibration level of the engine body based on the vibration component of the engine body in the specific frequency bandwidth;
the electronic control unit is configured to calculate a mechanical vibration level of the engine body based on the engine operation state;
the electronic control unit is configured to subtract the mechanical vibration level from the vibration level to calculate a combustion vibration level; and
the electronic control unit is configured to detect, as an ignition timing of fuel, a timing at which the combustion vibration level becomes equal to or greater than a predetermined combustion determination threshold.

5. The control device according to claim 4, wherein:
the electronic control unit is configured to specify, based on a waveform of the combustion vibration level at each crank angle simplified using a plurality of thresholds, a principal vibration portion when fuel for generating requested torque is combusted; and
the electronic control unit is configured to detect, as an ignition timing of fuel, a timing at which the combustion vibration level becomes equal to or greater than the combustion determination threshold in the principal vibration portion.

6. The control device according to claim 4, wherein:
the electronic control unit is configured to control the injection amount and the injection timing of fuel to be injected from the fuel injection valve such that fuel causes premix charged compressive ignition in an operation region on a low load side and fuel causes diffusive combustion in an operation region on a high load side; and
the electronic control unit is configured to, when fuel is combusted by premix charged compressive ignition, make the combustion determination threshold smaller than when fuel is combusted by diffusive combustion.

7. The control device according to claim 4, wherein the electronic control unit is configured to correct the combustion vibration level based on a moving average value of the deviation for a short period and a moving average value of the deviation for a long period.

8. A control method for an internal combustion engine including an engine body, a fuel injection valve configured to inject fuel into a combustion chamber of the engine body, and a vibration sensor configured to detect vibration of the engine body, the control method comprising: setting, by an electronic control unit, a target injection amount and a target injection timing based on an engine operation state; controlling, by the electronic control unit, an injection amount and an injection timing of fuel to be injected from the fuel injection valve to the target injection amount and the target injection timing, respectively; detecting, by the electronic control unit, an ignition timing of fuel based on a vibration component of the engine body in a specific frequency bandwidth, the specific frequency bandwidth being a bandwidth on a low frequency side of a frequency bandwidth where the engine body undergoes elastic vibration, and the specific frequency bandwidth being a bandwidth where a ratio of a combustion vibration component that is generated when the engine body is subjected to combustion pressure to vibration components detected by the vibration sensor becomes equal to or greater than a predetermined value; and correcting, by the electronic control unit, at least one of the target injection amount and the target injection timing based on a deviation between the detected ignition timing and a target ignition timing according to the engine operation state, wherein the specific frequency bandwidth is a frequency bandwidth of 0.1 kHz to 1.8 kHz.

* * * * *